US008746809B2

(12) United States Patent
Tachiiri

(10) Patent No.: US 8,746,809 B2
(45) Date of Patent: Jun. 10, 2014

(54) VEHICLE BRAKE CONTROL DEVICE

(75) Inventor: Yoshikazu Tachiiri, Chiryu (JP)

(73) Assignee: Advics Co., Ltd., Kariya-Shi, Aichi-Ken (JP)

( * ) Notice: Subject to any disclaimer, the term of this patent is extended or adjusted under 35 U.S.C. 154(b) by 255 days.

(21) Appl. No.: 13/075,709

(22) Filed: Mar. 30, 2011

(65) Prior Publication Data
US 2011/0240418 A1 Oct. 6, 2011

(30) Foreign Application Priority Data
Mar. 31, 2010 (JP) ................................. 2010-082318

(51) Int. Cl.
*B60T 13/74* (2006.01)
(52) U.S. Cl.
USPC .............................................. 303/15; 188/156
(58) Field of Classification Search
USPC ...................... 701/48, 70, 78; 303/3, 15, 89; 188/1.11 E, 1.11 R, 106 F, 106 P, 106 A, 188/156, 182, 265, DIG. 2
See application file for complete search history.

(56) References Cited

U.S. PATENT DOCUMENTS

| 4,944,372 | A  | * | 7/1990  | Taig ............................... 188/156 |
| 7,424,937 | B2 | * | 9/2008  | Henry et al. ................... 188/156 |
| 2004/0108769 | A1 | * | 6/2004  | Marathe ............................ 303/2 |
| 2006/0225971 | A1 | * | 10/2006 | Jaeger ......................... 188/106 P |
| 2006/0267402 | A1 |   | 11/2006 | Leiter et al. |
| 2007/0158148 | A1 | * | 7/2007  | Ohtani et al. .................. 188/158 |

FOREIGN PATENT DOCUMENTS

JP 2007-519568 A 7/2007

* cited by examiner

*Primary Examiner* — Bradley King
*Assistant Examiner* — Stephen Bowes
(74) *Attorney, Agent, or Firm* — Buchanan Ingersoll & Rooney PC

(57) ABSTRACT

When an EPB performs a locking operation of operating a parking brake, a pressure-decreasing limit control is performed until a driving shaft contacts a piston. Accordingly, even when the time of decreasing the W/C pressure by a service brake is equal to the time of brining the driving shaft having moved by the motor driving of the EPB into contact with the piston are equal to each other, it is possible to prevent the piston, which has been urged to the driving shaft with the decreasing of the W/C pressure, from colliding with the driving shaft with a great impact, thereby preventing a large load from being applied to the driving shaft.

4 Claims, 13 Drawing Sheets

VEHICLE BRAKE CONTROL DEVICE

BACKGROUND

The present invention relates to a vehicle brake control device that generates a braking force by moving a piston of a wheel cylinder (hereinafter, referred to as "W/C") by both a service brake and an electronic parking brake (hereinafter, referred to as "EPB") generating a hydraulic brake pressure on the basis of a driver's braking operation.

JP-T-2007-519568 discloses a brake system including an electrically-controllable service brake that can generate a braking force independently of a driver's operation and an electrically-controllable EPB that can generate and maintain a braking force.

In the brake system, W/C pressure by the service brake is employed to reduce the power of a motor at the time of operating a parking brake, thereby accomplishing a decrease in size of the EPB. Specifically, in the brake system, a piston of the W/C is moved not only by introducing a hydraulic brake pressure into the W/C by the service brake and but also by moving a driving shaft by driving the motor of the EPB. Accordingly, by moving the piston to a brake pad in advance using the W/C pressure by the service brake at the time of operating the parking brake, it is possible to reduce the power of the motor using the EPB. As a result, it is possible to reduce the size of the motor and thus to reduce the size of the EPB.

In such a brake system, at the time of releasing the W/C pressure by the service brake, the piston is urged to the driving shaft with the releasing of the W/C pressure by the restoring forces of the piston and the brake pad which have been elastically deformed by the W/C pressure. Accordingly, when the releasing of the W/C pressure by the service brake and the contact of the driving shaft, which has been moved by the motor driving of the EPB, with the piston are synchronized with each other, the piston having been urged to the driving shaft with the releasing of the W/C pressure may collide with the driving shaft with a great impact, thereby applying a large load to the driving shaft. In order to endure such an impact, an increase in size of an EPB mechanism such as the driving shaft, the W/C receiving the EPB mechanism, or a caliper body is likely to be necessary.

SUMMARY

The invention is made in consideration of the above-mentioned situation. An object of the invention is to provide a vehicle brake control device which can suppress a pressing member such as a piston urged to a moving member such as a driving shaft with the decrease in W/C pressure from colliding with the moving member with a great impact.

According to an aspect of the present invention, there is provided a vehicle brake control device comprising:
a first frictional member;
a second frictional member attached to a vehicle wheel;
an electronic parking brake configured to electrically generate a braking force by the first frictional member and the second frictional member;
a service brake configured to hydraulically generate a braking force by the first frictional member and the second frictional member; and
an electronic controller configured to control operations of the electronic parking brake and the service brake,
wherein the electronic parking brake includes:
an electronic parking brake mechanism configured to perform a locking operation of moving a moving member in a first direction in which the first frictional member approaches the second frictional member by forwardly rotationally driving an electric motor to move a pressing member and pressing the first frictional member against the second frictional member by the pressing member, a lock-holding operation of holding the pressed state of the first and second frictional members, and an releasing operation of controlling the moving member to move the moving member in a second direction in which the first frictional member is separated from the second frictional member by backwardly rotationally driving the electric motor to move the pressing member to separate the first frictional member from the second frictional member, and
a driving load detector configured to detect a driving load of the electric motor,
wherein the service brake includes:
a hydraulic brake pressure generator configured to generate a hydraulic brake pressure,
a wheel cylinder that is connected to the hydraulic brake pressure generator, moves the first frictional member in the first direction and presses the second frictional member by the pressing member when the hydraulic brake pressure increases, and moves the first frictional member in the second direction by the pressing member when the hydraulic brake pressure decreases, and
a hydraulic brake pressure adjusting unit configured tio adjust the hydraulic brake pressure of the wheel cylinder,
wherein the electronic controller includes a determining unit confifugred to determine a contact state where the moving member of the electronic parking brake contacns the pressing member, and
wherein the electronic parking brake performs a pressure-decreasing limit control of limiting the decrease in the hydraulic brake pressure by the hydraulic brake pressure adjusting unit if the contact state is not reached during the locking operation, and ends the pressure-decreasing limit control if the moving-member contact state is reached.

According to this vehicle brake control device, at the time of performing the locking operation of operating the parking brake, the pressure-decreasing limit control is performed until the moving member contacts the pressing member. Accordingly, even when the decrease in the hydraulic brake pressure in the wheel cylinder based on the service brake is sychronized with the contact of the moving member, which has been moved by the motor driving, with the pressing member, it is possible to prevent the pressing member, which has been urged to the moving shaft with the decreasing of the hydraulic brake pressure, from colliding with the moving member with a great impact, thereby preventing a large load from being applied to the moving member.

In this vehicle brake device, the determining unit may determine the contact state based on the driving load of the electric motor.

Further, the pressure-decreasing limit control may be performed so as to limit a pressure-decreasing rate of the hydraulic brake pressure of the wheel cylinder to a predetermined rate or less.

Furthermore, the electronic controller may perform the pressure-decreasing limit control if a pressure-decreasing rate of the hydraulic brake pressure is equal to or greater than a predetermined pressure-decreasing gradient while the electronic parking brake is performing the locking operation.

Furthermore, the pressure-decreasing rate of the hydraulic brake pressure may be adjusted so that a sum of an impact force at the time of bringing the moving member into contact with the pressing member, which is generated due to the movement of the moving member by the electronic parking brake at the time of performing the locking operation, and an impact force at the time of brining the pressing member into contact with the moving member, which is generated in the pressing member due to the decrease in the hydraulic brake pressure in the wheel cylinder and which is predicted based on the pressure-decreasing rate of the hydraulic brake pressure, is not greater than a predetermined threshold value.

Thereby, it is possible to set a more appropriate pressure-decreasing rate (VP).

Further, the electronic controller may include an estimating unit configured to estimate a contact time at which the contact state is reached, and wherein the electronic parking brake performs the pressure-decreasing limit control at a time point between the start of the locking operation and the estimated contact time.

Thereby, it is possible to perform the pressure-decreasing limit control only when necessary.

DESCRIPTION OF EXEMPLARY EMBODIEMNTS

Figure 1:
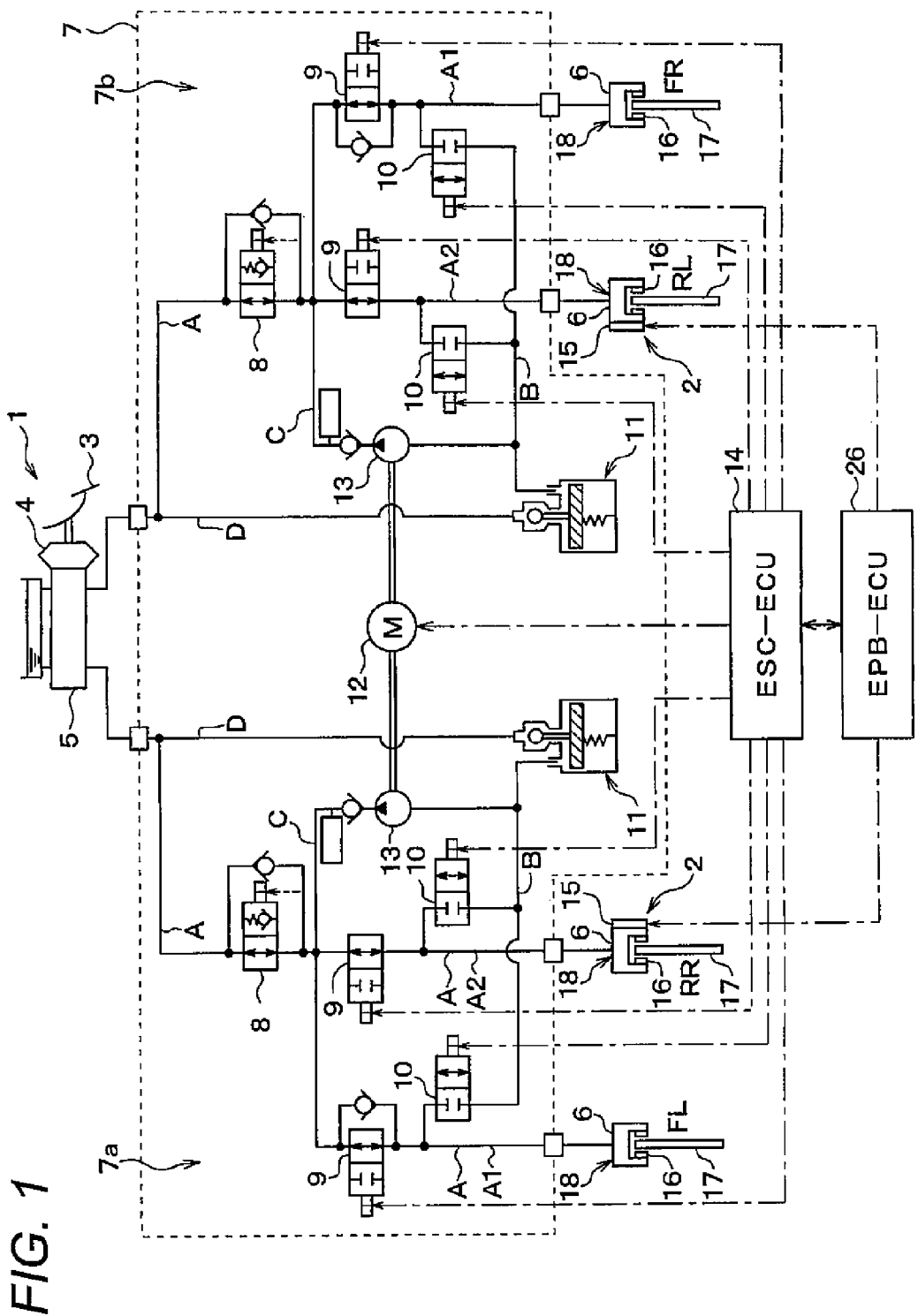
FIG. 1 is a diagram schematically illustrating the overall configuration of a vehicle brake system to which a vehicle brake control device according to a first embodiment of the invention is applied.

Hereinafter, exemplary embodiments will be described with reference to the accompanying drawings. In the below-described embodiments, elements equal or equivalent to each other are referenced by like reference numerals in the drawings.

First Embodiment

Figure 2:
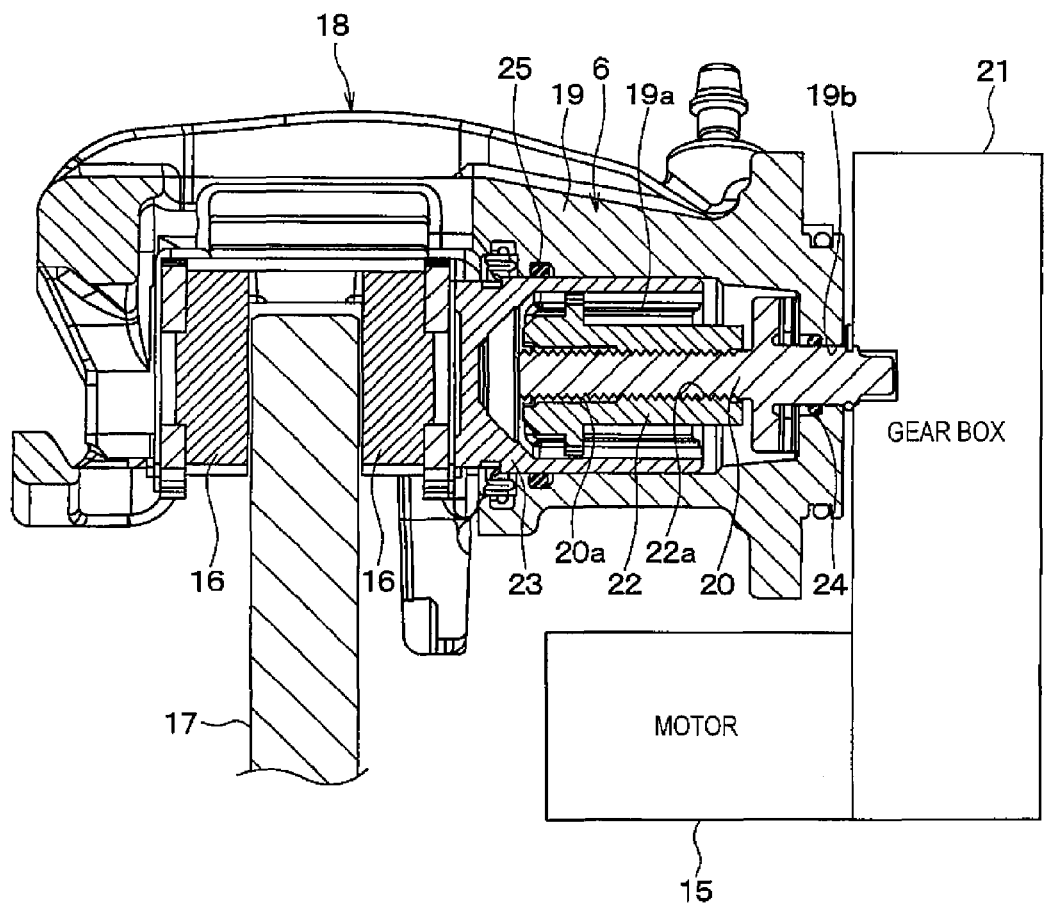
FIG. 2 is a sectional view schematically illustrating a rear-wheel brake mechanism of the brake system.

A first embodiment will be described. In this embodiment, a vehicle brake system employing a disc brake type EPB for a rear wheel system is exemplified as a vehicle brake control device according to an embodiment of the invention. FIG. 1 is a diagram schematically illustrating the overall configuration of a vehicle brake system employing the vehicle brake control device according to this embodiment. FIG. 2 is a sectional view schematically illustrating a rear-wheel brake mechanism of the brake system. This embodiment will be described below with reference to theses drawings.

As shown in FIG. 1, the brake system includes a service brake 1 that generates a braking force on the basis of a driver's pressing force and an EPB 2 that regulates the movement of a vehicle at the time of parking.

The service brake 1 generates a hydraulic brake pressure by a brake pedal 3, a booster 4, and a master cylinder 5 (hereinafter, referred to as "M/C"), which correspond to the hydraulic brake pressure generator. Specifically, the pressing force resulting from a driver's operation (pressing) on the brake pedal 3 is boosted by the booster 4, the hydraulic brake pressure corresponding to the boosted pressing force is generated in the M/C 5, and the generated hydraulic brake pressure is transmitted to a W/C 6 of the brake structure of each wheel, thereby generating the braking force. An actuator 7 used to control the hydraulic brake pressure is disposed between the M/C 5 and the W/C 6 and is configured to adjust the braking force generated by the service brake 1 and to perform a variety of controls (for example, anti-skid control) for improving the safety of the vehicle.

The hydraulic brake pressure controlling actuator 7 corresponds to the hydraulic brake pressure adjusting unit and includes a first piping system 7a and a second piping system 7b. The first piping system 7a controls the hydraulic brake pressure applied to a front-left wheel FL and a rear-right wheel RR and the second piping system 7b controls the hydraulic brake pressure applied to a front-right wheel FR and a rear-left wheel RL.

Since the first piping system 7a and the second piping system 7b have the same configuration, only the first piping system 7a will be described below and thus the second piping system 7b will not be described.

The first piping system 7a includes a pipe line A transmitting M/C pressure to the W/C 6 of the front-left wheel FL or the rear-right wheel RR and serving as a main pipe line used to generate the W/C pressure. The pipe line A includes a differential pressure control valve 8 that can be switched between a communicating state and a differential-pressure state. In the differential pressure control valve 8, the valve position is adjusted so as to be in the communicating state at the time of performing a normal braking operation of a driver's operating the brake pedal 3 (when a motion control is not performed) and the valve position is adjusted so as to be in the larger differential-pressure state as the current value increases when a current flows in a solenoid coil of the differential pressure control valve 8.

The pipe line A is branched into two pipe lines A1 and A2 at a position close to the W/C 6 and being downstream from the differential pressure control valve 8. Each of the pipe lines A1 and A2 is provided with a pressure-increasing control valve 9 that controls the pressure-increasing of the hydraulic brake pressure of the W/C 6 in the front-left wheel FL or the rear-right wheel RR. Each pressure-increasing control valve 9 is made up of a two-position electromagnetic valve that can be switched between a communicating state and a blocked state. Each pressure-increasing control valve 9 is a normally-opened type which is switched to the communicating state when a control current to a solenoid coil of the pressure-increasing control valve 9 is zero (at the time of the non-application of current) and which is switched to the blocked state when the control current flows in the solenoid coil (at the time of the application of current).

In a pipe line B as a pressure-decreasing pipe line connecting a pressure-adjusting reservoir 11 to a point between the pressure-increasing control valve 9 and each W/C 6 in the pipe line A, a pressure-decreasing control valve 10 that can be switched between a communicating state and a blocked state and that is made up of a two-position electromagnetic valve is disposed. The pressure-decreasing control valve 10 is a normally-closed type which is switched to the blocked state when a control current flowing in a solenoid coil of the pressure-decreasing control valve 10 is zero (at the time of the non-application of current) and which is switched to the blocked state when the control current flows in the solenoid coil (at the time of the application of current).

A pipe line C as a reflux pipe line is disposed between the pressure-adjusting reservoir 11 and the pipe line A as a main pipe line. The pipe line C is provided with a self-priming pump 13 that sucks and ejects a brake fluid to the M/C 5 or the W/C 6 from the pressure-adjusting reservoir 11 and is driven by the motor 12. The supply of voltage to the motor 12 is controlled by controlling the ON and OFF states of a motor relay not shown.

A pipe line D as an auxiliary pipe line is disposed between the pressure-adjusting reservoir 11 and the M/C 5. By causing the pump 13 to suction the brake fluid from the M/C 5 and to eject the brake fluid to the pipe line A via the pipe line D, the brake fluid is supplied to the W/C at the time of performing a motion control such as a roll-suppressing control or a traction (TCS) control, thereby increasing the W/C pressure of a target wheel.

Various controls using the hydraulic brake pressure controlling actuator 7 having the above-mentioned configuration are performed by an ESC (Electronic Stability Control)-ECU 14. For example, by outputting a control current for various control valves 8 to 11 or the pump-driving motor 12 of the hydraulic brake pressure controlling actuator 7 from the ESC-ECU 14, a hydraulic circuits of the hydraulic brake pressure controlling actuator 7 is controlled to control the W/C pressure transmitted to the W/C 6. Accordingly, it is possible to avoid a wheel from slipping, thereby improving the stability of the vehicle.

On the other hand, the EPB 2 generates a braking force by controlling a brake mechanism by the electric motor 15 and includes an EPB control system (hereinafter, referred to as "EPB-ECU") 26 controlling the driving of the electric motor 15.

The brake mechanism has a mechanical structure generating a braking force for each vehicle wheel, where a front-wheel brake mechanism is configured to generate the braking force by operating the service brake 1 and a rear-wheel brake mechanism is configured to generate the braking force by operating both the service brake 1 and the EPB 2. The front-wheel brake mechanism is a brake mechanism used in general in which a mechanism generating a braking force by operating the EPB 2 is removed from the rear-wheel brake mechanism and will not thus be described herein. In the following description, only the rear-wheel brake mechanism will be described.

The rear-wheel brake mechanism generates a frictional force between brake pads 16 and a brake disc 17 to generate the braking force by pressing the brake pads 16 as the first frictional member shown in FIG. 2 and pinching the brake disc 17 as the second frictional member between the brake pads 16 when the EPB 2 is operated as well as when the service brake 1 is operated.

Specifically, in the brake mechanism, as shown in FIG. 2, a body 19 of the W/C 6 pressing the brake pads 16 is disposed in a caliper 18 and a driving shaft 20 disposed in the body 19 is connected to the electric motor 15 via a gear box 21. By rotationally driving the electric motor 15, the rotary power of the electric motor 15 is transmitted to the driving shaft 20 via gears (not shown) disposed in the gear box 21 at a predetermined damping ratio. Accordingly, the brake pads 16 are moved to generate the braking force based on the EPB 2.

In the caliper 18, in addition to the W/C 6 and the brake pads 16, a part of an end of the brake disc 17 is received so as to be interposed between the brake pads 16. The W/C 6 generates the W/C pressure in a hollow portion 19a as a brake fluid containing chamber by introducing the brake fluid into the hollow portion 19a of the cylindrical body 19 via a communication channel not shown, and includes a driving shaft 20, a driving shaft 22, and a piston 23 in the hollow portion 19a.

An end of the driving shaft 20 is connected to a gear (not shown) in the gear box 21 via an insertion hole 19b formed in the body 19 and is rotationally driven with the rotational driving of the gear when the gear is rotationally driven. The end of the driving shaft 20 is axially supported by the insertion into the insertion hole 19b. Specifically, the end of the driving shaft 20 is axially supported using the insertion hole 19b as a bearing. An O ring 24 as the sealing member is disposed on the opposite side of the gear box 21 in the insertion hole 19b and the brake fluid is prevented from leaking between the driving shaft 20 and the inner wall surface of the insertion hole 19b by the O ring 24.

The driving shaft 22 corresponds to the moving member and is formed of a hollow cylindrical member. A female thread groove 22a screwed to a male thread groove 20a of the driving shaft 20 is formed in the inner wall surface thereof. The driving shaft 22 is formed in a cylindrical shape having a rotation-preventing key or a polygonal column shape, whereby the driving shaft 22 is not fully rotated even with the rotational driving of the driving shaft 20. Accordingly, when the driving shaft 20 is rotationally driven, the rotary power of the driving shaft 20 is converted into a force for moving the driving shaft 22 in the axis direction of the driving shaft 20 by the engagement of the male thread groove 20a and the female thread groove 22a. When the driving of the electric motor 15 is stopped, the driving shaft 22 is stopped at the same position by means of the frictional force due to the engagement of the male thread groove 20a and the female thread groove 22a. When the driving of the electric motor 15 is stopped at the time of reaching a target braking force, the driving shaft 22 can be held at the position.

The piston 23 corresponds to the pressing member and is formed of a bottomed cylindrical member or a bottomed polygonal tubular member so as to surround the outer periphery of the driving shaft 22. The outer peripheral surface thereof contacts the inner wall surface of the hollow portion 19a formed in the body 19. A sealing member 25 is disposed on the inner wall surface of the body 19 so as to prevent the brake fluid from leaking between the outer peripheral surface of the piston 23 and the inner wall surface of the body 19, whereby the W/C pressure can be given to the end surface of the piston 23. When a rotation-preventing key is disposed in the driving shaft 22 so that the driving shaft 22 is not fully rotated even with the rotational driving of the driving shaft 20, the piston 23 is provided with a key groove in which the key slides. When the driving shaft 22 has a polygonal column shape, the piston is formed in a polygonal tube shape corresponding thereto.

The brake pads 16 are disposed at an end of the piston 23 and the brake pads 16 are moved in the right-left direction of the drawing with the movement of the piston 23. Specifically, the piston 23 is configured to be movable to the left of the drawing with the movement of the driving shaft 22 and to be movable to the left of the drawing independently of the driving shaft 22 when the W/C pressure is applied to an end (the opposite end of the end having the brake pads 16) of the piston 23. When the driving shaft 22 is located as an initial position (in a state before the electric motor 15 is rotationally driven) and the hydraulic brake pressure is not applied to the hollow portion 19a (the W/C pressure=0), the piston 23 moves to the right of the drawing by means of a return spring not shown or a negative pressure in the hollow portion 19a so as to separate the brake pads 16 from the brake disc 17. When the W/C pressure is zero at the time of rotationally driving the electric motor 15 to move the driving shaft 22 from the initial position to the left of the drawing, the movement of the piston 23 to the right of the drawing is regulated by the moved driving shaft 22 and the brake pads 16 are supported at that position.

In the brake mechanism having the above-mentioned configuration, when the service brake 1 is operated, the piston 23 is moved to the left of the drawing by means of the applied W/C pressure and the brake pads 16 are pressed against the brake disc 17, thereby generating the braking force. When the EPB 2 is operated, the electric motor 15 is driven to rotate the driving shaft 20. Accordingly, the driving shaft 22 is moved toward the brake disc 17 (to the left of the drawing) by means of the engagement of the male thread groove 20a and the female thread groove 22a. The piston 23 is accordingly moved in the same direction and the brake pads 16 are pressed against the brake disc 17, thereby generating the braking force. Accordingly, it is possible to implement a common brake mechanism that generates the braking force by operating both the service brake 1 and the EPB 2.

When the EPB 2 is operated in the state where the W/C pressure is generated by operating the service brake 1, the piston 23 is already moved to the left of the drawing with the W/C pressure, whereby the load applied to the driving shaft 22 is reduced. Accordingly, until the driving shaft 22 contacts the piston 23, the electric motor 15 is driven substantially in a non-load state. When the driving shaft 22 contacts the piston 23, the pressing force for pressing the piston 23 to the left of the drawing is added to generate the brake force based on the EPB 2.

The EPB-ECU 26 corresponds to the electronic controller, is made up of a known micro computer including a CPU, a ROM, a RAM, and an I/O, and performs a parking brake control by controlling the rotational driving of the electric motor 15 in accordance with a program stored in the ROM or the like. For example, the EPB-ECU 26 receives a signal corresponding to an operating state of an operation switch (SW) disposed in an instrument panel of the vehicle interior not shown and drives the electric motor 15 on the basis of the operating state of the operation SW. Specifically, when a driver operates the operation SW to operate the parking brake, the EPB-ECU 26 forwardly drives the electric motor 15 to generate a braking force, stops the driving of the electric motor 15 when a desired braking force is generated, and releases the braking force based on the parking brake by backwardly driving the electric motor 15 when the driver operates the operation SW to release the parking brake.

The operation of the brake system having the above-mentioned configuration will be described. In the brake system according to this embodiment, when a driver operates the operation SW to operate the parking brake, the EPB 2 works to perform a locking operation. Specifically, the electric motor 15 is driven and the driving shaft 20 is forwardly driven via the gear box 21. At this time, in the brake system, the driver may press the brake pedal 3 in advance to generate the W/C pressure based on the service brake 1, whereby the piston 23 moves to the brake pads 16 (to the left of the drawing). In this state, since a gap is disposed between the inner wall surface of the piston 23 and the end surface of the driving shaft 22, a load for moving the piston 23 is not applied at the time of moving the driving shaft 22 and thus the electric motor 15 can be driven substantially in a non-load state until the driving shaft 22 contacts the piston 23.

When the electric motor 15 is continuously driven and the driving shaft 22 contacts the piston 23, the brake pads 16 are pressed with the force by which the driving shaft 22 presses the piston 23. Accordingly, the force by which both brake pads 16 pinch the brake disc 17 can be held by the EPB 2. For this reason, even when the driver releases the pressing of the brake pedal 3, it is possible to guarantee the braking force based on the parking brake using the EPB 2.

The contact state between the driving shaft 22 and the piston 23 and the force by which the brake pads 16 are pressed by the piston 23, that is, the magnitude of the braking force generated by the EPB 2, are proportional to the load applied to the electric motor 15. Accordingly, a motor driving current MI used to drive the electric motor 15 is measured in advance by an amperemeter or the like not shown and the driving of the electric motor 15 is stopped when it is detected that the motor driving current reaches a current value corresponding to a target braking force. Accordingly, it is possible to the target braking force based on the EPB 2 by means of the frictional force between the male thread groove 20a of the driving shaft 20 and the female thread groove 22a of the driving shaft 22.

During the locking operation of the parking brake, when the driver's operation on the brake pedal 3 is released and the W/C pressure based on the service brake 1 is released, the piston 23 is urged to the driving shaft 22 at the same time as releasing the W/C pressure by means of the restoring forces of the piston 23 and the brake pads 16 having been elastically deformed by the W/C pressure. Accordingly, when the releasing of the W/C pressure based on the service brake 1 is synchronized with the contact of the driving shaft 22, which has been moved by the motor driving of the EPB 2, with the piston 23 during the operation of the EPB 2, the piston 23 urged to the driving shaft 22 at the same time as releasing the W/C pressure may collide with the driving shaft 22 with a great impact, thereby applying a large load to the driving shaft 22. In order to endure such an impact, there is a problem in which the W/C 6 should increase in size or the like. Particularly, when a large W/C pressure is applied, a moment bending the overall W/C 6 is generated in the axis direction. Accordingly, the force corresponding to the moment increases with the releasing of the W/C pressure, thereby increasing the impact force.

Accordingly, in the brake system according to this embodiment, by performing a pressure-decreasing limit control process limiting the sudden decrease of the W/C pressure during the locking operation, the above-mentioned problem is prevented from occurring. The details of the pressure-decreasing limit control process will be described below.

Figure 3:
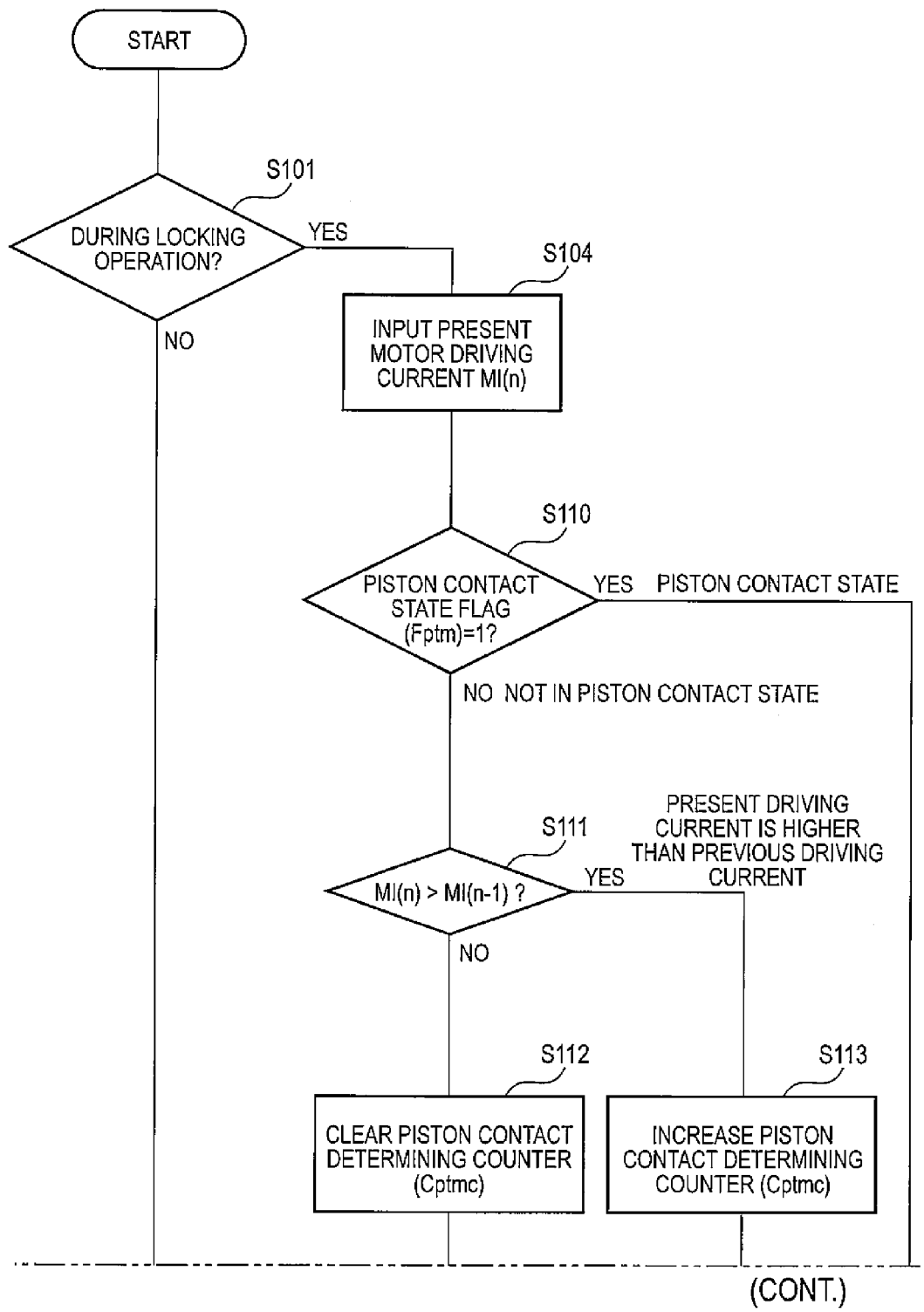
FIG. 3 is a flow diagram illustrating the details of a pressure-decreasing limit control process.
Figure 3:
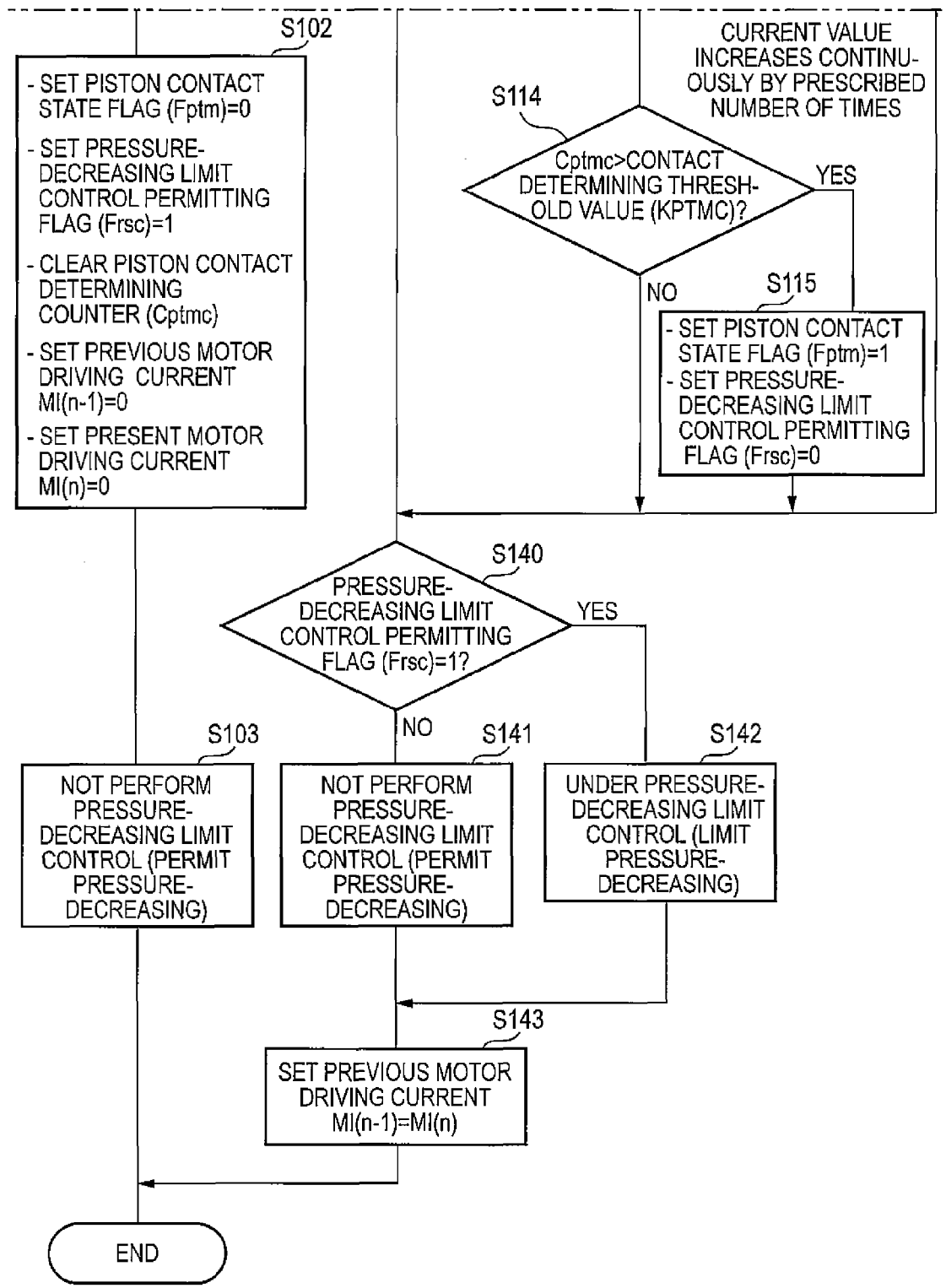

FIG. 3 is a flow diagram illustrating the details of the pressure-decreasing limit control process. The pressure-decreasing limit control process shown in the drawing is carried out by the EPB-ECU 26 in accordance with a program stored in a ROM (not shown) built therein and is carried out every predetermined control period by interlocking with the action of the operation SW.

First, in step S101, it is determined whether the locking operation is performed. This determination on the locking operation can be performed, for example, on the basis of the operating state of the operation SW.

Here, when it is determined that the locking operation is not performed, a piston contact state flag (Fptm) representing the state on whether the driving shaft 22 and the piston 23 contact each other is reset to 0 in advance in step S102, which represents that they do not contact each other. When the locking operation is started, a pressure-decreasing limit control permitting flag (Frsc) representing whether the pressure-decreasing limit control should be permitted is set to 1, which represents that the pressure-decreasing limit control is permitted. A piston contact determining counter (Cptmc) used to determine the contact state of the driving shaft 22 and the piston 23 is cleared. The motor driving current MI(n−1) of the previous control period and the motor driving current MI(n) of the present control period are both set to 0.

In step S103, since the locking operation is not performed presently, the pressure-decreasing limit control is not permitted. Accordingly, when a driver releases the pressing of the brake pedal 3, the W/C pressure based on the service brake 1 decreases in accordance with the driver's operation.

On the other hand, when it is determined in step S101 that the locking operation is performed, the motor driving current MI(n) of the present control period is input in step S104 and then the process of step S110 is performed. In step S110, it is determined whether the piston contact state flag (Fptm) is 1. At the initial time in the locking operation, the piston contact state flag (Fptm) is set to 0 in step S102 and thus it is determined that the piston contact state is not reached.

In step S111, it is determined whether the previous motor driving current MI(n−1) is greater than the present motor driving current MI(n). As described above, the electric motor 15 is driven substantially in the non-load data until the driving shaft 22 contacts the piston 23. When the driving shaft 22 contact the piston 23, a load is applied to the electric motor 15. Accordingly, until the driving shaft 22 contacts the piston 23, there is no difference between the previous motor driving current MI(n−1) and the present motor driving current MI(n). When the driving shaft 22 contacts the piston 23, the value of the present motor driving current MI(n) is greater than the value of the previous motor driving current MI(n−1).

Accordingly, until the determination result in step S111 is affirmative, the piston contact determining counter (Cptmc) is cleared in step S112. When the determination result in step S111 is affirmative, the piston contact determining counter (Cptmc) is made to increase in step S113.

Thereafter, in step S114, it is determined whether the piston contact determining counter (Cptmc) is greater than a contact determining threshold value (KPTMC). That is, the present motor driving current MI(n) may become greater than the previous motor driving current MI(n−1) by noise. Accordingly, by determining in this step whether the value of the motor driving current MI continuously increases by a prescribed number of times, the case where the motor driving current MI increases by noise is excluded. Since the motor driving current varies from 0 to the driving current value with no load at the time of starting the motor just after the locking operation is started, it may be erroneously determined that the piston contact state is reached just after the locking operation is started depending on the setting of the contact determining threshold value (KPTMC). In this case, by performing a process of masking the determination in step S114 or the like just after the driving operation is started, it is possible to satisfactorily prevent the erroneous determination.

Here, when the determination result is affirmative, the piston contact state flag (Cptmc) is set to 1 in step S115 so as to represent that the driving shaft 22 contacts the piston 23. The pressure-decreasing limit control permitting flag (Frsc) is reset to 0 so as to release the pressure-decreasing limit control.

In this way, the pressure-decreasing limit control permitting flag (Frsc) can be set to 1 or reset to 0 depending on the contact state of the driving shaft 22 with the piston 23. Thereafter, it is determined in step S140 whether the pressure-decreasing limit control permitting flag (Frsc) is set to 1. When the determination result is negative, the pressure-decreasing limit control is not permitted in step S141. Accordingly, when the driver releases the pressing of the brake pedal 3, the W/C pressure based on the service brake 1 is decreased as it is done.

On the contrary, when the determination result in step S140 is affirmative, the pressure-decreasing limit control is performed in step S142. Accordingly, when the driver releases the pressing of the brake pedal 3, the W/C pressure based on the service brake 1 is not decreases as it is done but the pressure-decreasing limit control is performed. Specifically, by duty-controlling the pressure-increasing control valves 9 of the rear wheels RL and RR in the EPB 2, the decrease of the W/C pressure is limited to a predetermined gradient. Accordingly, the sudden decreasing of the W/C pressure is prevented. Therefore, even when the releasing of the W/C pressure based on the service brake 1 is synchronized with the contact of the driving shaft 22, which has been moved by the motor driving of the EPB 2, with the piston 23, it is possible to prevent the piston 23, which has been urged to the driving shaft 22 with the releasing of the W/C pressure, from colliding with the driving shaft 22 with a great impact, thereby not applying a large load to the driving shaft 22.

After the processes of steps S141 and S142, the details stored as the previous motor driving current MI(N−1) is updated to the motor driving current MI(n) of the present control period in step S143 and the flow of process is ended.

Figure 4:
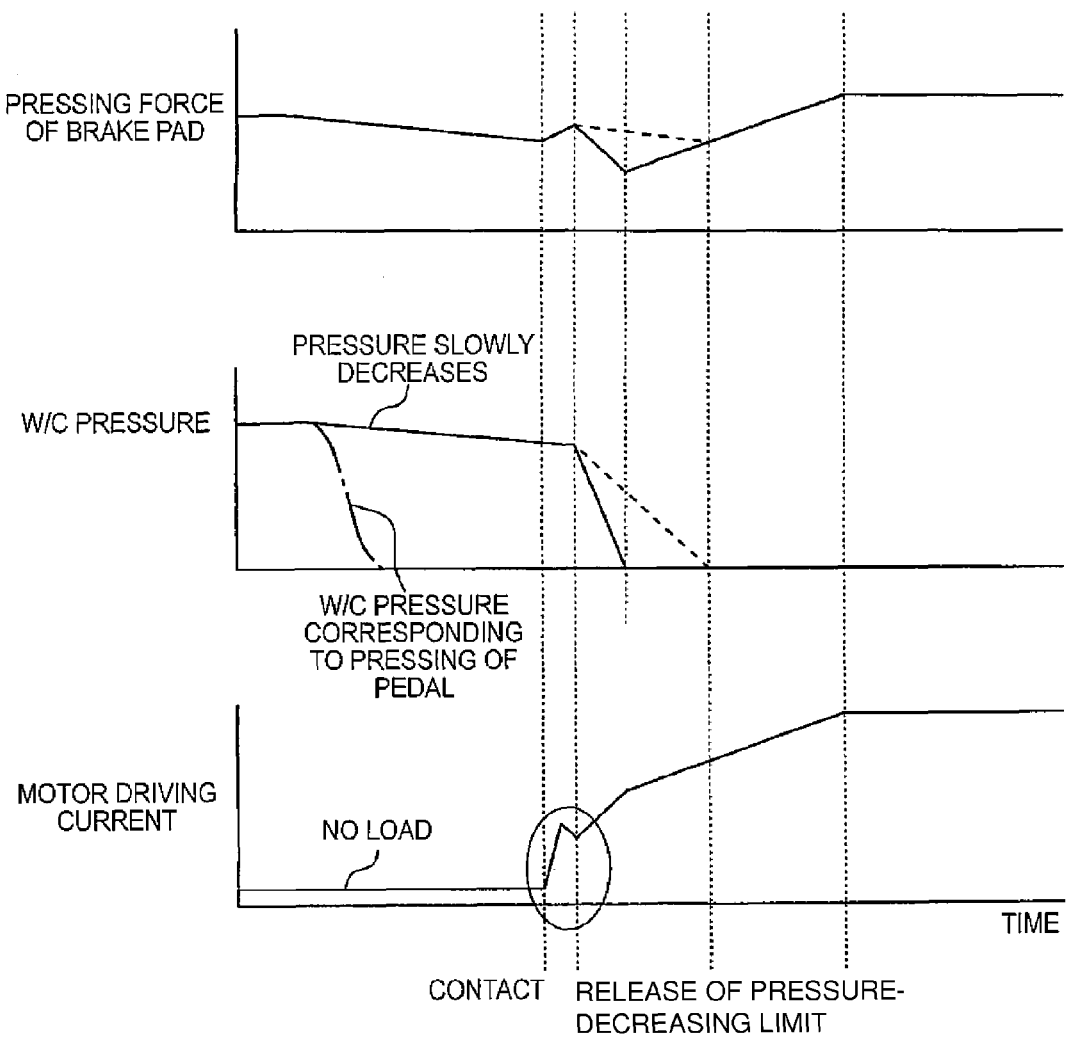
FIG. 4 is a timing diagram illustrating the performance of the pressure-decreasing limit control process.

FIG. 4 is a timing diagram illustrating the performance of the pressure-decreasing limit control process performed as described above, where it is assumed that the driver releases the pressing of the brake pedal 3 during the locking operation.

When the driver operates the operation SW to operate the parking brake and instructs the EPB 2 to perform the locking operation, a driving current flows in the electric motor 15. The motor driving current MI is a non-load current having the smallest current value, because the driving shaft 22 does not contact the piston 23. Since the W/C pressure is generated by the service brake 1 due to the driver's operation (pressing) on the brake pedal 3, the brake pads 16 are pressed against the brake disc 17 with a predetermined pressing force.

Here, when the driver releases the pressing of the brake pedal 3 before the brake pads 16 contact the brake disc 17, the W/C pressure corresponding to the pressing of the brake pedal 3 suddenly decreases as indicated by a one-dot chained line in the drawing. However, at this time, since the decrease of the W/C pressure is limited by the pressure-decreasing limit control as described above, the pressure decreases with a slower gradient than that decreasing gradient of the W/C pressure corresponding to the pressing of the brake pedal 3.

When the driving shaft 22 contacts the piston 23, the motor driving current MI increases and the driving shaft 22 presses the piston 23 at the same time, whereby the pressing force of the brake pads 16 increases. When the increase of the motor driving current MI is sensed, the pressure-decreasing limit control is not performed and the driving of the pressure-increasing control valve 9 is stopped, whereby the W/C pressure decreases.

Accordingly, since the pressing force of the brake pads 16 temporarily decreases but the pressing force of the brake pads 16 slowly increases by the EPB 2, there is no particular problem. However, in order to suppress the decrease of the pressing force of the brake pads 16, the duty ratio of the pressure-increasing control valve 9 may be adjusted, as indicated by a broken line in the drawing, so that the pressure-decreasing gradient is rapider than that of the pressure-decreasing limit control and the pressure-decreasing gradient of the W/C pressure is slower than that in the case where the driving of the pressure-increasing control valve 9 is completely stopped.

As described above, in the brake system according to this embodiment, at the time of performing the locking operation to operate the parking brake by the EPB 2, the pressure-decreasing limit control is performed until the driving shaft 22 contacts the piston 23. Accordingly, even when the decrease of the W/C pressure based on the service brake 1 is synchronized with the contact of the driving shaft 22, which has been moved by the motor driving of the EPB 2, with the piston 23, it is possible to prevent the piston 23, which has been urged to the driving shaft 22 with the releasing of the W/C pressure, from colliding with the driving shaft 22 with a great impact, thereby not applying a large load to the driving shaft 22.

Second Embodiment

A second embodiment of the invention will be described below. The second embodiment is different from the first embodiment, in that a piston position is estimated and it is determined whether the pressure-decreasing limit control should be performed on the basis of the estimation result, and is the same as the first embodiment in the other configurations. Accordingly, only the different points from the first embodiment will be described below.

In the brake system according to this embodiment, the pressure-decreasing limit control performed by the EPB-ECU 26 is different from that in the first embodiment and the other points are the same as described in the first embodiment. Accordingly, the pressure-decreasing limit control process will be described below.

Figure 5:
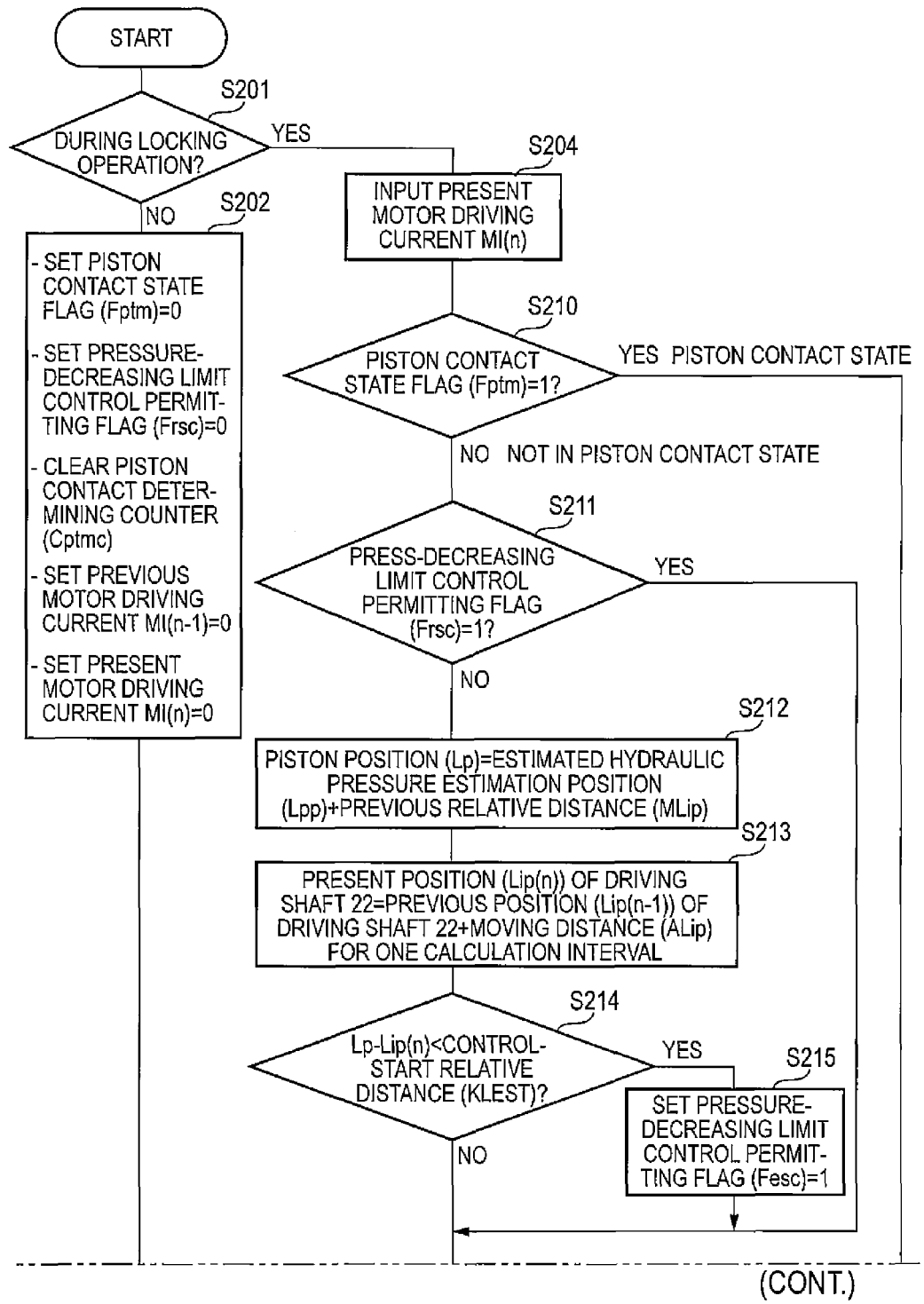
FIG. 5 is a flow diagram illustrating the details of the pressure-decreasing limit control process performed by a brake system according to a second embodiment of the invention.
Figure 5:
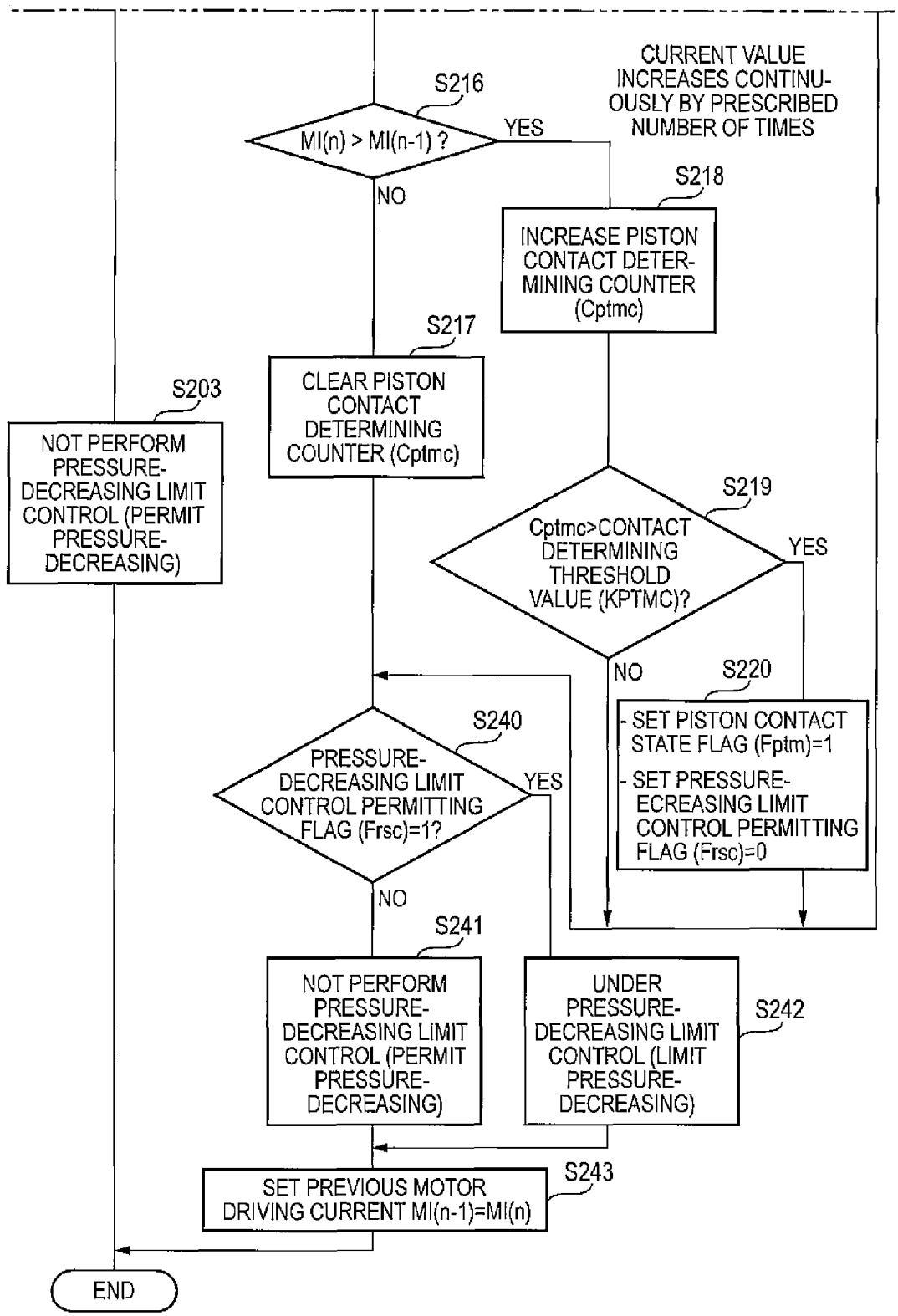

FIG. 5 is a flow diagram illustrating the details of the pressure-decreasing limit control process performed by the brake system according to this embodiment. The pressure-decreasing limit control process shown in the drawing is also carried out every predetermined control period, for example, by interlocking with the operation of the operation SW. However, a part of the pressure-decreasing limit control process according to this embodiment is the same as described in the first embodiment and thus the other part will be described below.

First, in step S201, it is determined whether the locking operation is performed, similarly to step S101 in the first embodiment shown in FIG. 3. Then, when the determination result in step S201 is negative, the process of step S202 is performed. In this step, the same process as step S102 of FIG. 3 is basically performed, but the pressure-decreasing limit control permitting flag (Frsc) is not set to 1 but set to 0. That is, in this embodiment, since the time of bringing the driving shaft 22 into contact with the piston 23 can be estimated by estimating the piston position, the pressure-decreasing limit control is performed just before the contact. Accordingly, in this step, the pressure-decreasing limit control permitting flag (Frsc) is reset to 0, whereby the pressure-decreasing limit control is not performed as the same time as starting the locking operation. The motor driving current MI(n−1) of the previous control period and the motor driving current MI(n) of the present control period are set to 0.

Thereafter, in step S203, the pressure-decreasing limit control is not performed, similarly to step S103 shown in FIG. 3.

On the other hand, when it is determined in step S201 that the locking operation is being performed, the motor driving current MI(n) of the present control period is input in step S204 and the same process as step S110 shown in FIG. 3 is performed in step S210. Subsequently, in steps S211 to S215, the process of estimating the piston position is performed.

Specifically, it is first determined in step S211 whether the pressure-decreasing limit control permitting flag (Frsc) is set to 1. This process is performed to check whether the pressure-decreasing limit control permitting flag (Frsc) is set to 1 in the state where the time of bringing the driving shaft 22 into contact with the piston 23 comes in by the process of estimating the piston position. Here, when the determination result is negative, the process of step S212 is performed.

Figure 6:
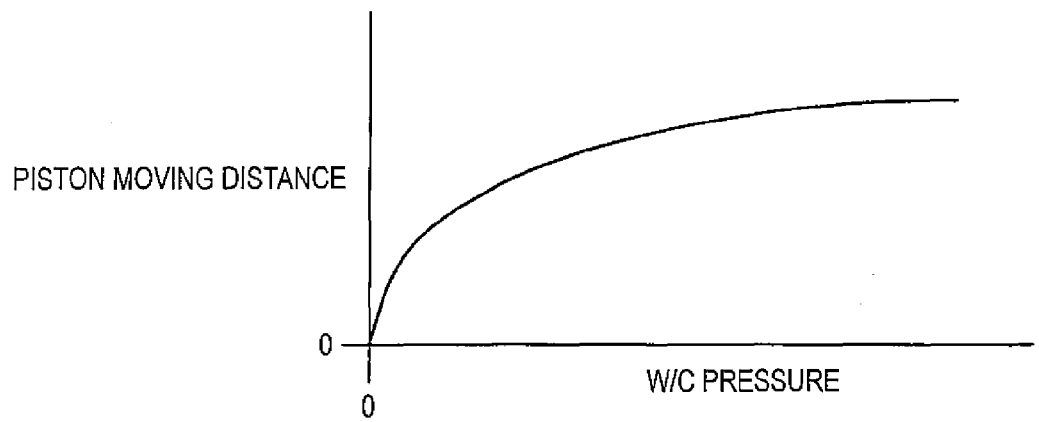
FIG. 6 is a map diagram illustrating the relation between a W/C pressure and a piston moving distance.

In step S212, the piston position (Lp) is calculated from the sum of an estimated hydraulic pressure position (Lpp) and the previous relative distance (MLip). By this process, the position of the piston 23 returned previously can be corrected and obtained depending on the W/C pressure. Here, the piston position (Lp) represents the relative position of the piston 23 with respect to the initial position of the driving shaft 22 (the position before the locking operation is started), that is, the distance until the end of the driving shaft 22 contacts the piston 23. The estimated hydraulic pressure position (Lpp) represents the moving distance of the piston 23 corresponding to the W/C pressure. The moving distance of the piston 23 corresponding to the W/C pressure increases as the W/C pressure increases, for example, as shown in the map diagram of FIG. 6 showing the relation between the W/C pressure and the moving distance of the piston. Accordingly, the moving distance of the piston 23 can be calculated on the basis of the map (or a function expression corresponding thereto). The previous relative distance (MLip) represents the distance between the piston 23 and the driving shaft 22 when the piston 23 is previously returned to the right of the drawing. The previous relative distance is calculated by a distance calculating process to be described later.

The W/C pressure may be measured directly by a W/C pressure sensor. Since the W/C pressure is the same as the M/C pressure in the normal braking operation in which the hydraulic brake pressure control is not performed, a M/C pressure sensor may be provided and the measured M/C pressure may be used as the W/C pressure.

Figure 7:
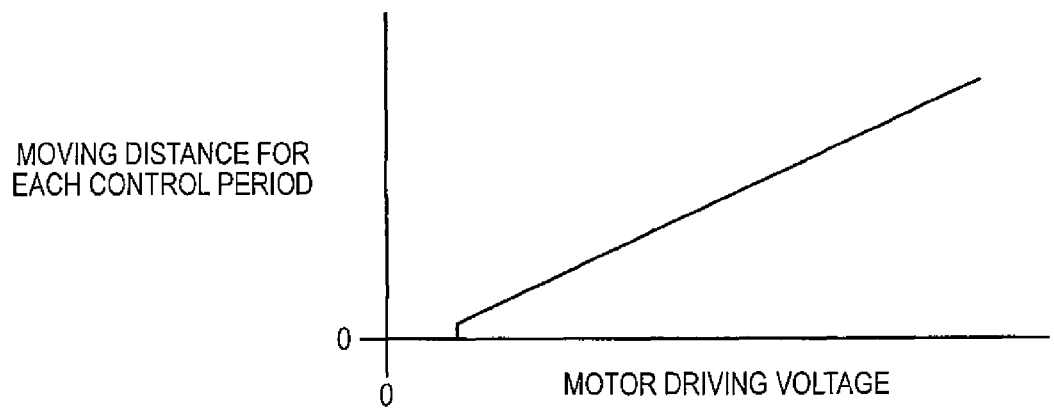
FIG. 7 is a map diagram illustrating the relation between a motor driving voltage and a moving distance every control period.

Subsequently, in step S213, the present position (Lip(n)) of the driving shaft 22 is obtained from the sum of the previous position (Lip(n−1)) of the driving shaft 22 and the moving distance (ALip) of one control period. The moving distance of one control period represents the distance by which the driving shaft 22 moves in one control period on the basis of the rotation of the electric motor 15. The moving distance of one control period varies depending on the driving voltage of the electric motor 15, that is, a battery voltage. As shown in the map diagram of FIG. 7 illustrating the relation between the motor driving voltage and the moving distance of one control period, the moving distance of one control period increases as the motor driving voltage increases. Accordingly, the moving distance of one control period can be calculated on the basis of the map (or a function expression corresponding thereto). The battery voltage can be acquired by inputting the battery voltage detected from a power supply circuit not shown or the like to the EPB-ECU 26 via a LAN.

The initial value of the previous position (Lip(n−1)) of the driving shaft 22 is 0 and is calculated as the sum of the moving distance of one control period (ALip) from the start of the locking operation to the previous control period. Accordingly, by calculating the sum of the previous position (Lip(n−1)) of the driving shaft 22 and the moving distance of one control period (ALip), the moving distance from the initial position of the driving shaft 22 is obtained.

In step S214, a difference (Lp−Lip(n)) between the piston position (Lp) and the present position (Lip(n)) of the driving shaft 22 is calculated and it is determined whether the calculated difference is less than a control start relative distance (KLFST) which is a start threshold value of the pressure-decreasing limit control. The difference (Lp−Lip(n)) corresponds to the moving distance of the piston 23 from the initial position of the driving shaft 22 and the moving distance of the driving shaft 22 from the initial position of the driving shaft 22, that is, the relative distance between the driving shaft 22 and the piston 23 (the gap up to the contact). Accordingly, it is possible to determine whether the driving shaft 22 is going to contact the piston 23 by this process.

Here, when the determination result is affirmative, it means that the driving shaft 22 and the piston 23 are going to contact each other. Accordingly, the pressure-decreasing limit control permitting flag (Frsc) is set to 1 in step S215 to start the pressure-decreasing limit control. When the determination result is negative, it means that there is a gap of time until the driving shaft 22 and the piston 23 contact each other, and thus the pressure-decreasing limit control permitting flag (Frsc) is maintained in 0.

Thereafter, in steps S216 to S220, the same processes as steps S111 to S115 shown in FIG. 3 are performed. Then, in steps S240 to S243, the same processes as steps S140 to S143 shown in FIG. 3 are performed. In this way, the pressure-decreasing limit control process according to this embodiment is performed.

Figure 8:
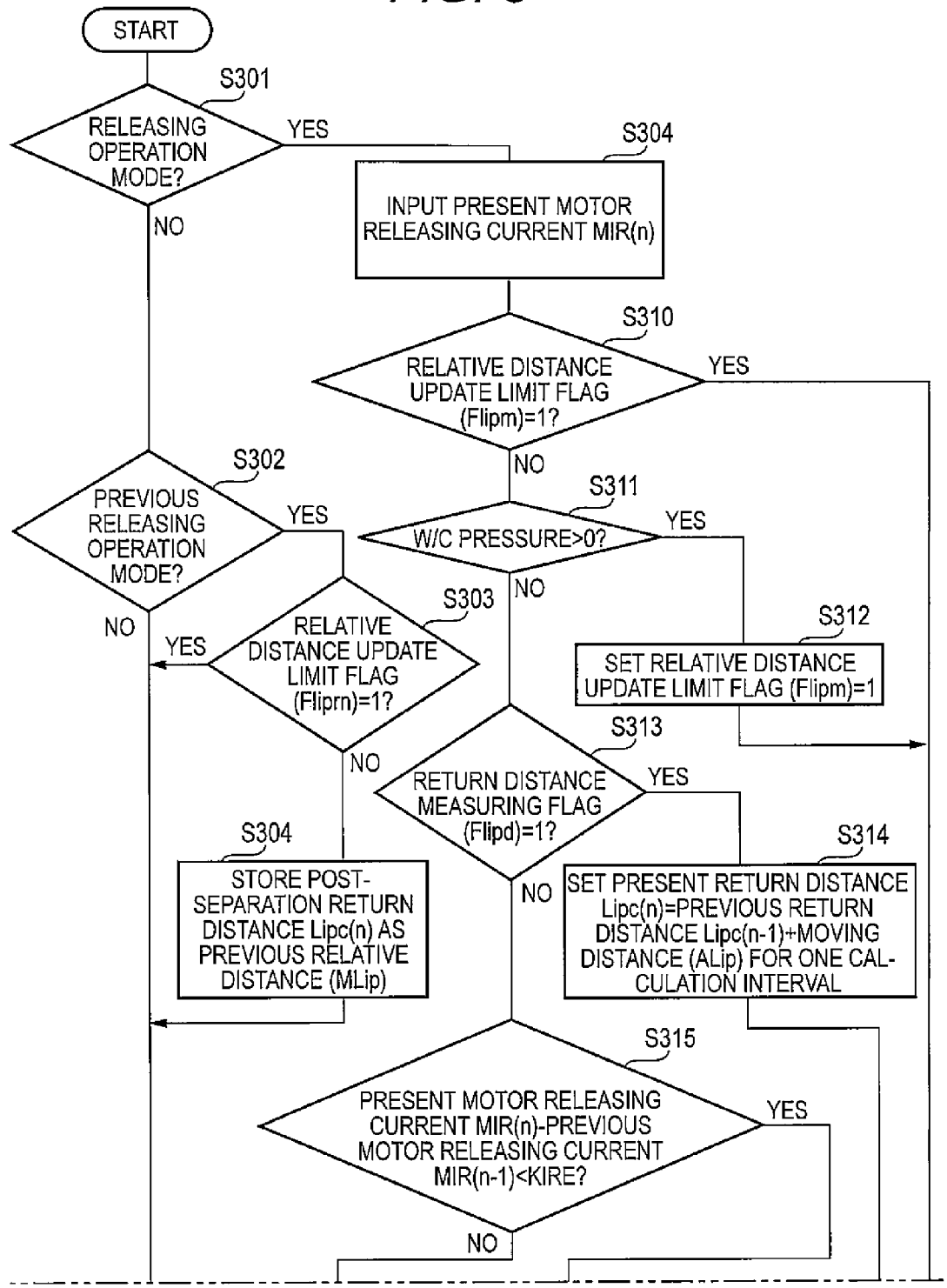
FIG. 8 is a flow diagram illustrating the details of a distance calculating process for calculating a previous relative distance (MLip).
Figure 8:
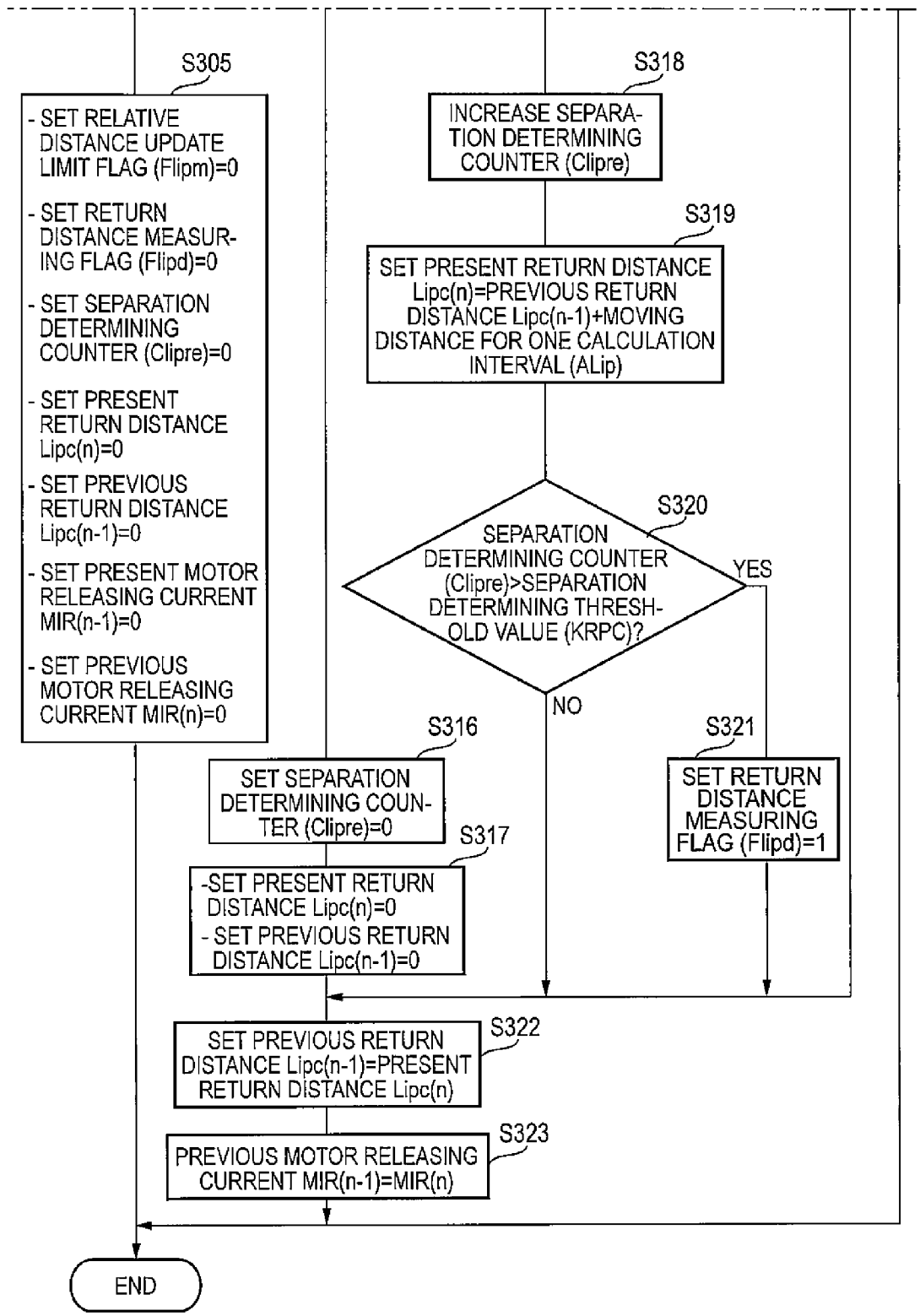

FIG. 8 is a flow diagram illustrating the details of the distance calculating process of calculating the previous relative distance (MLip).

First, it is determined in step S301 whether a releasing operation mode is set. This determination can be carried out on the basis of the operating state of the operation SW and the driving state of the electric motor 15. The releasing operation mode is set when the operation W is in the released state and the releasing operation mode is set during the period where the electric motor 15 is backwardly rotationally driven. The releasing operation mode is released when the driving of the electric motor 15 is stopped. Here, the process of step S302 is performed before the releasing operation mode is set.

In step S302, it is determined whether the releasing operation mode is set in the previous control period. Here, when the determination result is affirmative, it is determined in step S303 whether a relative distance update limit flag (Fliprn) is set to 1. The relative distance update limit flag (Fliprn) is set to limit the update of the relative distance and is set for the situation where the releasing operation mode is set but the W/C Pressure is generated. Here, when the determination result is negative, the post-separation return distance Lipc(n) is stored as the previous relative distance MLip in step S304. The post-separation return distance Lipc(n) represents the distance by which the driving shaft 22 is returned to the right of the drawing after it is separated from the piston 23.

Thereafter, the relative distance update limit flag (Fliprn) is reset to 0 in step S305. A return distance measuring flag (Flipd), a separation determining counter (Clipre), a present return distance (Lipc(n)), and a previous return distance (Lipc(n)) are all set to 0. The return distance measuring flag (Flipd) is a flow representing that the distance by which the driving shaft 22 is returned to the right of the drawing from the state where it contacts the piston 23 is being measured. The separation determining counter (Clipre) is a counter used to determine whether the driving shaft 22 is separated from the piston 23. The present return distance (Lipc(n)) and the previous return distance (Lipc(n)) are the return distance Lipc measured in the present and previous control periods. The motor releasing current MIR(n−1) of the previous control period and the motor releasing current MIR(n) of the present control period are both set to 0.

On the other hand, when it is determined in step S301 that the releasing operation mode is set, the motor releasing current MIR(n) of the present control period is input in step S304 and then the process of step S310 is performed. Similarly to step S303, it is determined in step S310 whether the relative distance update limit flag (Fliprn) is set to 1. When the determination result is affirmative, the flow of process is ended. Only when the determination result is negative, the process of step S311 is performed. In step S311, it is determined whether the W/C pressure is greater than 0, that is, when the W/C pressure is generated. Here, when the W/C pressure is generated, it means that a force for urging the piston 23 to the brake pads 16 is applied. In this case, the contact state of the driving shaft 22 with the piston 23 cannot be satisfactorily seen. Accordingly, the relative distance update limit flag (Fliprn) is set to 1 in step S312 and the flow of processes is ended.

When it is determined in step S311 that the W/C pressure is not generated, it is determined in step S313 whether the return distance measuring flag (Flipd) is set to 1. At the initial time of the releasing operation mode, the return distance measuring flag (Flipd) is set to 0 in step S305 and thus the determination result is basically negative. However, when the return distance measuring flag (Plipd) is set to 1 in advance, the present return distance Lipc(n) is calculated from the sum of the previous return distance Lipc(n−1) and the moving distance (ALip) of one control period in step S314. The moving distance of one control period represents the distance by which the driving shaft 22 moves in one control period with the rotation of the electric motor 15. The moving distance of one control period varies depending on the driving voltage of the electric motor 15, that is, the battery voltage, as described above, and can be calculated from the map shown in FIG. 7.

The initial value of the previous return distance Lipc(n−1) is 0 and is calculated as an integrated value of the moving distance (ALip) of one control period from the setting of the releasing operation mode to the previous control period. Accordingly, by calculating the sum of the previous return distance Lipc(n−1) and the moving distance (ALip) of one control period, the moving distance of the driving shaft 22 from the time of setting the releasing operation mode is calculated.

When the determination result in step S313 is negative, it is determined in step S315 whether the difference between the previous motor releasing current MIR(n−1) and the present motor releasing current MIR(n) is less than a threshold value KIRE. The threshold value KIRE is a value used to determine that the driving shaft 22 is separated from the piston 23 and is set to be smaller than the decreasing amount of the motor releasing current MIR used to determine that the driving shaft 22 is not separated from the piston 23. That is, the variation of the motor releasing current MIR at the time of performing releasing operation is reverse to that at the time of performing the locking operation, the motor releasing current MIR is great when the force with which the driving shaft 22 presses the piston 23 is great at the initial time of the releasing operation mode but becomes the non-load current value again when the force decreases and the driving shaft 22 is separated from the piston 23. Accordingly, when the difference between the previous motor releasing current MIR(n−1) and the present motor releasing current MIR(n) is less than the threshold value KIRE, it can be considered that the driving shaft 22 is separated from the piston 23.

Accordingly, when the determination result in this step is negative, it means that the driving shaft 22 is not separated from the piston 23 and thus the separation determining counter (Clipre) is reset to 0 in step S316. In step S317, the present return distance (Lipc(n)) and the previous return distance (Lipc(n−1)) are both reset to 0.

On the other hand, when the determination result in step S315 is affirmative, the driving shaft 22 may be separated from the piston 23 and thus the separation determining counter (Clipre) is made to increase in step S318. In step S319, the present return distance Lipc(n) is calculated by performing the same process as step S314.

Thereafter, in step S320, it is determined whether the separation determining counter (Clipre) is equal to or less than a separation determining threshold value (KRPC). That is, the variation of the motor releasing current MIR may decrease by noise. Accordingly, it is determined in this step whether the variation of the current value of the motor releasing current MIR is small continuously by a prescribed number of times, whereby the case where the variation of the motor releasing current MIR is decreased by noise is excluded.

Here, when the determination result is affirmative, the return distance measuring flag (Flipd) is set to 1 so as to represent that the driving shaft 22 is separated from the piston 23 in step S321 and then the process of step S322 is performed. Accordingly, in the subsequent control periods, the determination result in step S313 is affirmative and the present return distance Lipc(n) is calculated in step S314 without performing the processes of step S315 and steps subsequent thereto. When the determination result in step S320 is negative, the process of step S322 is performed with the return distance measuring flag (Flipd) set to 0.

In this way, it can be seen whether the return distance should be measured depending on the contact state between the driving shaft 22 and the piston 23. The details stored as the previous return distance Lipc(n−1) are updated to the present return distance Lipc(n) in step S322, the motor releasing current MIR(n−1) of the previous control period is updated to the motor releasing current MIR(n) of the present control period in step S323, and then the flow of processes is ended. In this way, the previous return distance Lipc(n−1) can be calculated.

Figure 9:
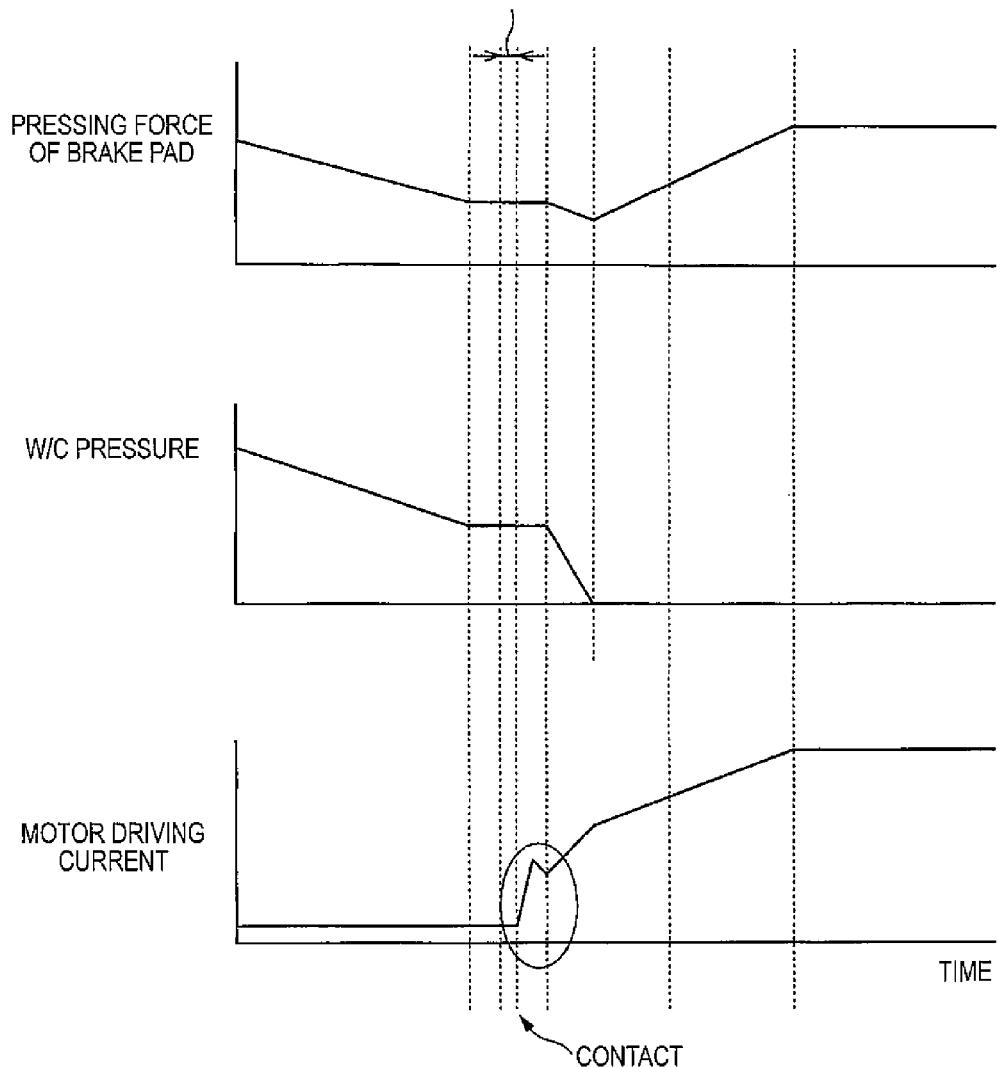
FIG. 9 is a timing diagram illustrating the performance of the pressure-decreasing limit control process.

FIG. 9 is a timing diagram illustrating the performance of the pressure-decreasing limit control process, where it is assumed that the driver releases the pressing of the brake pedal 3 during the locking operation.

When the driver operates the operation SW to operate the parking brake and the locking operation of the EPB 2 is released, the driving current flows in the electric motor 15. The motor driving current MI is a non-load current which is the smallest current value, because the driving shaft 22 does not contact the piston 23. At this time, as shown in the drawing, when the driver slowly releases the pressing of the brake pedal 3, the W/C pressure decreases to correspond to the releasing. Then, just before the driving shaft 22 contacts the piston 23, the previous contact is detected and the pressure-decreasing limit control is performed. Accordingly, the decrease of the W/C pressure is limited and the W/C pressure is maintained, for example, as shown in the drawing. Thereafter, even when the driver relaxes the pressing of the brake pedal 3 and the releasing of the W/C pressure based on the service brake 1 is synchronized with the contact of the driving shaft 22, which has been moved by the motor driving of the EPB 2, with the piston 23, it is possible to prevent the piston 23, which has been urged to the driving shaft 22 with the releasing of the W/C pressure, from colliding with the driving shaft 22 with a great impact, thereby not applying a large load to the driving shaft 22.

When the driving shaft 22 contacts the piston 23, the motor driving current MI increases and the driving shaft 22 presses the piston 23 at the same time, whereby the pressing force of the brake pads 16 increases. When the increase of the motor diving current MI is detected, the pressure-decreasing limit control is not performed and the driving of the pressure-increasing control valve 9 is stopped, thereby decreasing the W/C pressure.

As described above, instead of detecting the contact between the driving shaft 22 and the piston 23 on the basis of the relative distance therebetween and starting the pressure-decreasing limit control at the same time as performing the locking operation, the pressure-decreasing limit control may be performed at a time point from the start of the locking operation to the time point when the driving shaft 22 and the piston 23 contact each other. Accordingly, it is possible to perform the pressure-decreasing limit control only if necessary and thus to prevent a large load from being applied to the driving shaft 22 by bringing the piston 23 in collision with the driving shaft 22 with a great impact.

According to this control type, even when the drive suddenly releases the pressing of the brake pedal 3 and thus the W/C pressure rapidly decreases before the driving shaft 22 contacts the piston 23, the piston 23 having been urged toward the driving shaft 22 does not contact the driving shaft 22 by means of the restoring force thereof.

When the contact time between the driving shaft 22 and the piston 23 is estimated as described above, there may be a gap between the estimated time and the actual time as shown in FIG. 9. Specifically, since the initial position of the piston 23 varies due to the abrasion of the brake pads 16, such a gap may be generated. In this case, the estimation result of the subsequent estimated contact time may be corrected on the basis of the gap between the estimated time and the actual time. For example, the subsequent estimated contact time can be set to a corrected time by subtracting the gap from the estimated time.

Third Embodiment

A third embodiment will be described below. The third embodiment is different from the first and second embodiments, in that the impact force of the driving shaft 22 and the piston 23 is estimated and the pressure-decreasing rate of the W/C pressure is set on the basis of the allowable impact force, and is the same as the first and second embodiments in the other points. Accordingly, only the points different from the first and second embodiments will be described.

The impact force of the driving shaft 22 and the piston 23 in the EPB 2 is greatly affected by the moving speed of the driving shaft 22. The allowable impact force KSLIM of the driving shaft 22 and the piston 23 is a value determined in advance depending on the structure of the W/C 6. Accordingly, by measuring the impact force Sipv for each motor driving voltage determining the moving speed and subtracting the measured impact force Sipv from the allowable impact force KSLIM, the impact force (KSLIM-Sipv) allowable in the decrease of the W/C pressure. Accordingly, the pressure-decreasing limit control has only to be performed on the basis of the impact force (KSLIMP-Sipv) allowable in the decrease of the W/C pressure and the sum of the impact force Sipv due to the moving speed of the driving shaft 22 and the impact force due to the decrease of the W/C pressure has only to be set not to be greater than the allowable impact force KSLIM. In this embodiment, the duty ratio of the pressure-increasing control valve 9 at the time of performing the pressure-decreasing limit control is set on the basis of the above-mentioned knowledge.

Figure 10:
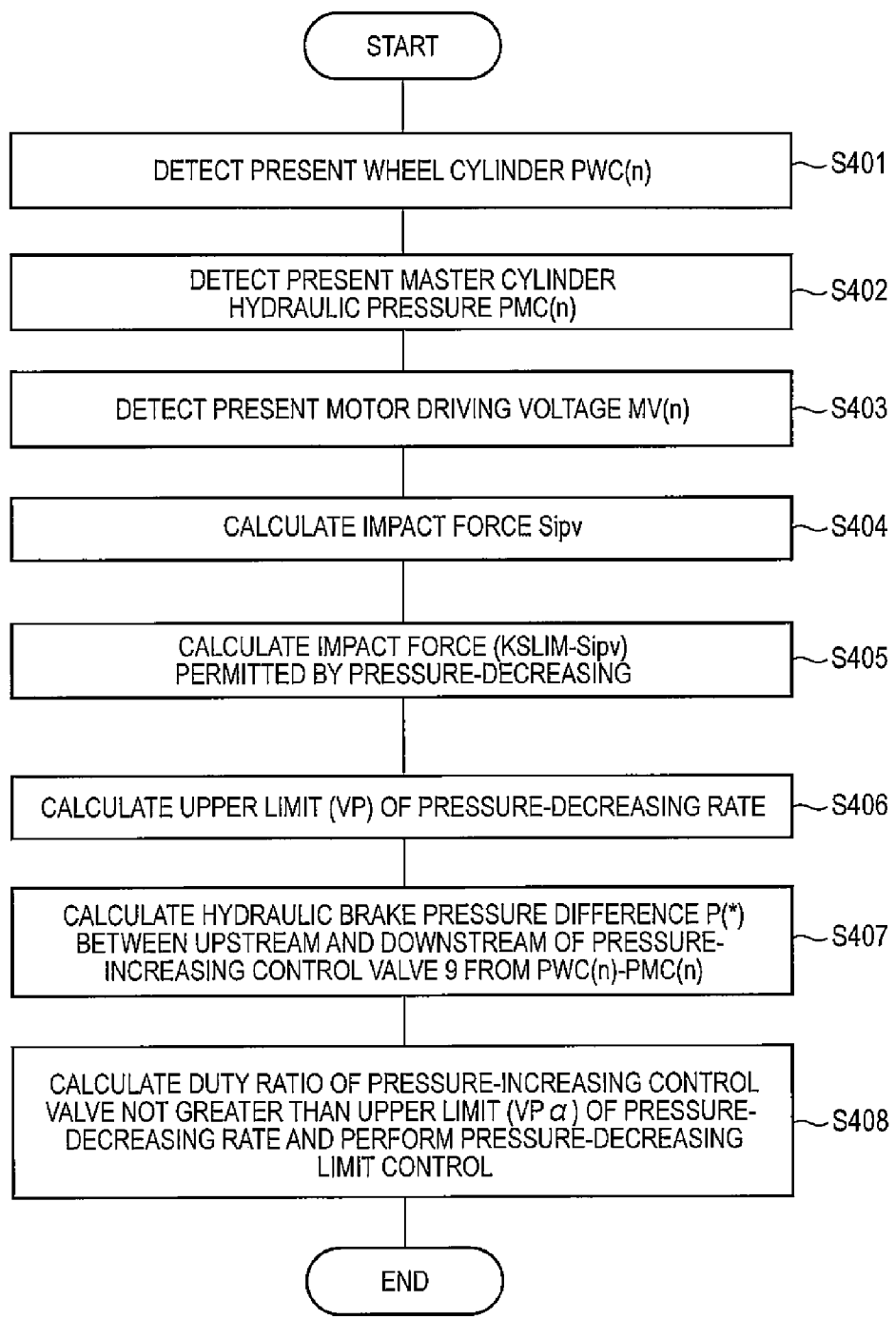
FIG. 10 is a flow diagram illustrating the details of a pressure-decreasing rate setting process performed by a brake system according to the second embodiment of the invention.

FIG. 10 is a flow diagram illustrating the pressure-decreasing limit control process. This process is performed by a flow different from the flows of the pressure-decreasing limit control process shown in FIGS. 3 and 5. For example, when the pressure-decreasing limit control permitting flag is set to 1, the pressure-decreasing limit control process is performed every predetermined calculation period as a timer convolution process.

First, various detecting processes are performed in steps S401 to S403. Specifically, a present W/C pressure PWC(n) is detected in step S401. Here, the present W/C pressure PWC(n) is detected on the basis of a detection signal of a W/C pressure sensor not shown. In step S402, a present M/C pressure PMC(n) is detected. Here, the present M/C pressure PMC(n) is detected on the basis of a detection signal of a M/C pressure sensor not shown. In step S403, a present motor driving voltage MV(n) is detected. For example, by inputting the battery voltage detected from a power supply circuit not shown to the EPB-ECU 26 via a LAN, the motor driving voltage MV(n) can be acquired.

Figure 11:
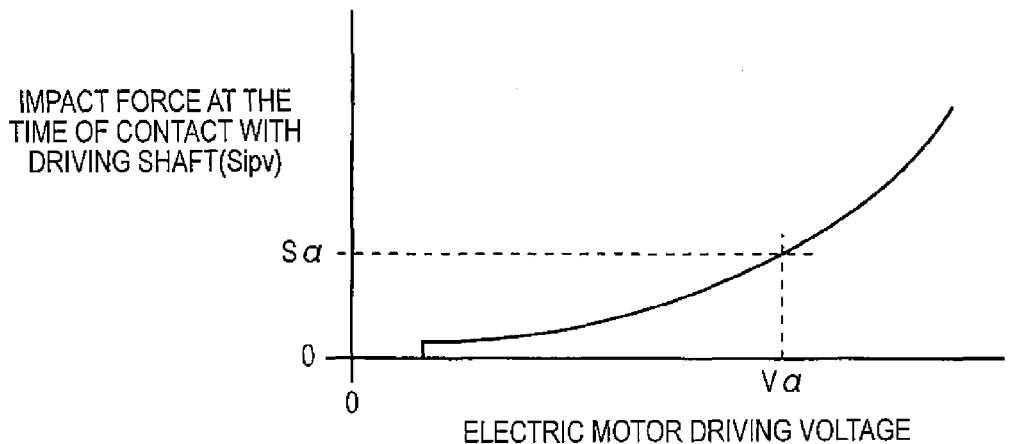
FIG. 11 is a map diagram illustrating the relation between a motor driving voltage MV(n) and an impact force Sipv when a driving shaft 22 contacts a piston 23.

In step S404, the impact force Sipv of the EPB 2 based on the moving speed of the driving shaft 22 is calculated. As described above, the impact force Sipv based on the moving speed of the driving shaft 22 depends on the motor driving voltage MV(n). FIG. 11 is a map diagram illustrating the relation between the motor driving voltage MV(n) and the impact force Sipv by which the driving shaft 22 contacts the piston 23. As the motor driving voltage MV(n) increases, the moving speed increases in proportion thereto and the impact force Sipv is proportional to the square of the motor driving voltage MV(n). Accordingly, the impact force Sipv can be calculated on the basis of the detection result in step S403 and the map shown in FIG. 11 (or a function expression corresponding thereto). For example, when the motor driving voltage (MV(n) is V$\alpha$, the impact force Sipv corresponding thereto is S$\alpha$, as shown in FIG. 11.

Figure 12:
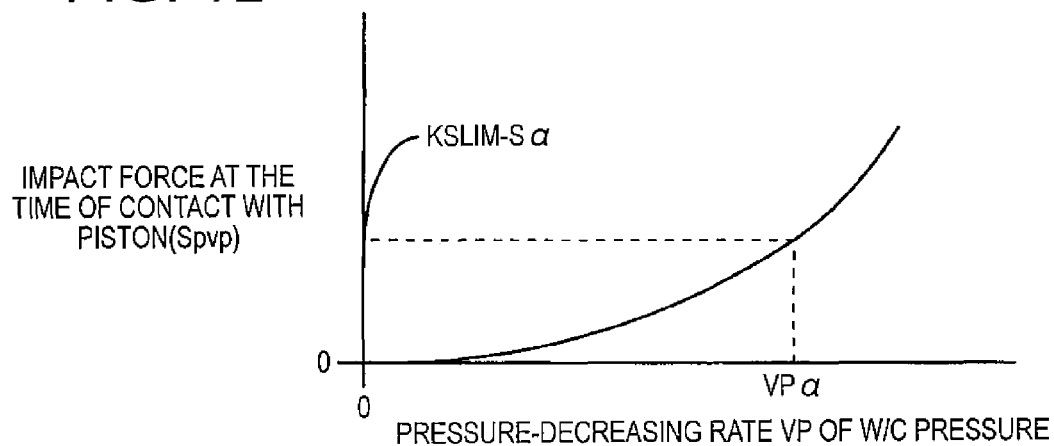
FIG. 12 is a map diagram illustrating the relation between a pressure-decreasing rate VP of a W/C pressure and an impact force Spvp when the piston 23 contacts the driving shaft 22 not moving.

Subsequently, in step S405, the impact force (KSLIM-Sipv) allowable in the decrease in pressure is calculated by subtracting the impact force Sipv (=S$\alpha$) calculated in advance from the predetermined allowable impact value KSLIM. As described above, when the impact force Sipv is S$\alpha$, the impact force (KSLIM-Sipv) allowable in the decrease in pressure is KSLIM-S$\alpha$. Thereafter, in step S406, the upper limit of the pressure-decreasing rate VP is calculated from the impact force (KSLIM-Sipv) allowable in the decrease in pressure so that the sum of the impact force Sipv based on the moving speed of the driving shaft 22 and the impact force (KSLIM-Sipv) allowable in the decrease of the W/C pressure is not greater than the allowable impact force KSLIM. FIG. 12 is a map diagram illustrating the relation between the pressure-decreasing rate VP of the W/C pressure and the impact force Spvp when the piston 23 contacts the driving shaft 22. As shown in the drawing, the impact force Spvp is proportional to the square of the pressure-decreasing rate of the W/C pressure. Accordingly, the upper limit of the pressure-decreasing rate VP of the W/C pressure can be calculated on the basis of the impact force (KSLIM-Sipv) calculated in step S405 and the map shown in FIG. 12 (or a function expression corresponding thereto). For example, as shown in FIG. 12, the upper limit of the pressure-decreasing rate VP of the W/C pressure corresponding to the impact force (KSLIM-S$\alpha$) is VP$\alpha$.

Figure 13:
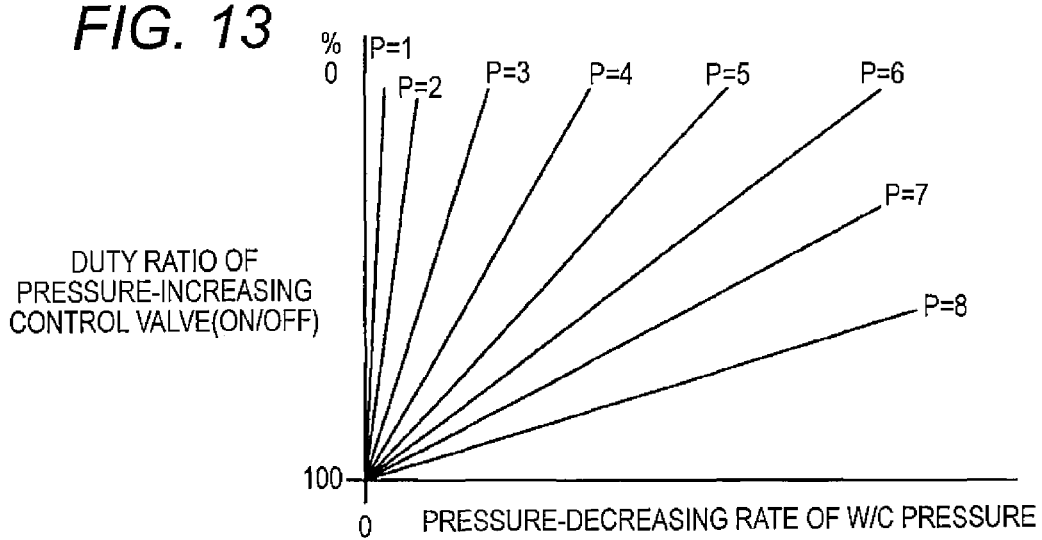
FIG. 13 is a map diagram illustrating the relation between the pressure-decreasing rate VP of the W/C pressure for each value of a hydraulic brake pressure difference P(*) and a duty ratio of a pressure-increasing control valve 9.

In step S407, a hydraulic brake pressure difference P(*) generated between upstream and downstream of the pressure-increasing control valve 9 is calculated from a difference (PWC(n)-PMC(n)) between the present W/C pressure PWC(n) and the present M/C pressure PMC(n) which are calculated in steps S401 and S402. In step S408, the duty ratio of the pressure-increasing control valve 9 corresponding to a pressure-decreasing rate not great the upper limit VP$\alpha$ of the pressure-decreasing rate VP is calculated on the basis of the present hydraulic brake pressure difference P(*). The pressure-decreasing rate VP corresponding to the duty ratio of the pressure-increasing control valve 9 varies depending on the hydraulic brake pressure difference P(*). FIG. 13 is a map diagram illustrating the relation between the pressure-decreasing rate VP of the W/C pressure and the duty ratio of the pressure-increasing control valve 9 for each hydraulic brake pressure difference P(*). As shown in the drawing, as the value of the hydraulic brake pressure difference P(*) increases, the pressure-decreasing rate VP increases evenwith the decrease of the duty ratio. Accordingly, the relation, which corresponds to the hydraulic brake pressure difference P(*) calculated in step S407, between the pressure-decreasing rate VP of the W/C pressure and the pressure-increasing control valve 9 is selected and the duty ratio corresponding to the upper limit VP$\alpha$ of the pressure-decreasing rate VP of the W/C pressure is calculated on the basis of the selected relation. With the duty ratio in which the pressure-decreasing rate VP is lower than that corresponding to the calculated duty ratio, the pressure-increasing control valve 9 is controlled to perform the pressure-decreasing limit control.

In this way, the impact forces Sipv and Spvp of the driving shaft 22 and the piston 23 can be predicted and the upper limit VP$\alpha$ of the pressure-decreasing rate VP of the W/C pressure can be set on the basis of the allowable impact force (KSLIM-Sipv). Then, by controlling the pressure-increasing control valve 9 so as not to be greater the upper limit VP$\alpha$ of the pressure-decreasing rate VP, it is possible to set a more preferable pressure-decreasing rate VP.

Other Embodiments

In the above-mentioned embodiments, the configuration shown in FIG. 2 has been exemplified as a brake configuration in which the power of the electric motor 15 at the time of operating the parking brake is reduced using the pressurizing function of the service brake as the EPB 2. The configuration shown in FIG. 1 has been exemplified as the hydraulic circuit configuration of the brake system. However, the configurations are only examples and other configurations may be employed. For example, any hydraulic circuit configuration can be employed by the brake system as long as a control valve that can control the pressure-decreasing gradient of the W/C pressure is provided to the hydraulic brake pressure controlling actuator 7.

It has been described in the above-mentioned embodiments that the pressure-increasing control valve 9 is controlled to perform the pressure-decreasing limit control of the W/C pressure, but the pressure-decreasing limit control may be performed by controlling the differential pressure control valve 8. The duty ratio of the pressure-increasing control valve 9 has been controlled, but the pressure-increasing control valve 9 may be used as a linear valve that changes the pressure difference between upstream and downstream depending on the amount of current applied and the pressure-decreasing rate of the W/C pressure may be performed by adjusting the amount of current applied.

When the pressure-decreasing limit control is performed using the differential pressure control valve 8, the EPB-ECU 26 may use the M/C pressure or the W/C pressure at the time of starting a differential pressure control as an instructed pressure at the time of starting the control via the ESC-ECU 14, may gradually decrease the instructed pressure, and may give the amount of current corresponding to the instructed pressure to the differential pressure control valve, whereby the W/C pressure can be made to decrease at any rate. The motor 12 need not be driven during the differential pressure limit control, but the differential pressure limit control may be performed even when the motor 12 is driven. As shown in FIG. 1, when a single differential pressure control valve 8 can be configured to control the hydraulic pressures of two wheels in the same hydraulic pressure system 7a and 7b, the pressure-increasing control valves 9 of the vehicle wheels FL and FR which are not intended to be subjected to the pressure-decreasing limit control can be closed and the pressure can be decreased using the pressure-decreasing control valve 10, so as to prevent the pressure-decreasing limit control from being performed on the other vehicle wheels FL and FR in the same system as the rear wheels RL and RR. At this time, by finely operating the pressure-decreasing control valve 10 in accordance with the W/C pressure or the stroke of the brake pedal 3 to decrease the pressure, it is possible to decrease the W/C pressure in accordance with the driver's operation.

In the first embodiment, the pressure-decreasing limit control has been performed always during the locking operation until the driving shaft 22 contacts the piston 23, but the pressure-decreasing limit control may be performed only when the pressure-decreasing rate of the W/C pressure is equal to or greater than a predetermined pressure-decreasing gradient.

In the above-mentioned embodiments, the disc brake type EPB 2 has been exemplified, but other types, for example, a drum brake type, may be employed. In this case, the first frictional member and the second frictional member are a brake shoe and a drum, respectively.

The steps shown in the drawings correspond to means for performing various processes. That is, In the EPB-ECU 26, parts performing the processes of steps S104 and S204 correspond to the driving load detector, parts performing the processes of steps S111 to S115 or the processes of steps S216 to 220 correspond to the moving member contact determining unit, and parts performing the process of step S214 corresponds to the moving member contact estimating unit.

What is claimed is:

1. A vehicle brake control device comprising:
   a first frictional member;
   a second frictional member attached to a vehicle wheel;
   an electronic parking brake configured to electrically generate a braking force by the first frictional member and the second frictional member;
   a service brake configured to hydraulically generate a braking force by the first frictional member and the second frictional member; and
   an electronic controller configured to control operations of the electronic parking brake and the service brake,
   wherein the electronic parking brake includes:
      an electronic parking brake mechanism configured to perform a locking operation of moving a moving member in a first direction in which the first frictional member approaches the second frictional member by forwardly rotationally driving an electric motor to move a pressing member and pressing the first frictional member against the second frictional member by the pressing member, a lock-holding operation of holding the pressed state of the first and second frictional members, and a releasing operation of controlling the moving member to move the moving member in a second direction in which the first frictional member is separated from the second frictional member by backwardly rotationally driving the electric motor to move the pressing member to separate the first frictional member from the second frictional member, and
      a driving load detector configured to detect a driving load of the electric motor,
   wherein the service brake includes:
      a hydraulic brake pressure generator configured to generate a hydraulic brake pressure,
      a wheel cylinder that is connected to the hydraulic brake pressure generator, moves the first frictional member in the first direction and presses the second frictional member by the pressing member when the hydraulic brake pressure increases, and moves the first frictional member in the second direction by the pressing member when the hydraulic brake pressure decreases, and
      a hydraulic brake pressure adjusting unit configured to adjust the hydraulic brake pressure of the wheel cylinder,
   wherein the electronic controller includes a determining unit configured to determine a contact state where the moving member of the electronic parking brake contacts the pressing member,
   wherein the electronic parking brake performs a pressure-decreasing limit control of limiting the decrease in the hydraulic brake pressure by the hydraulic brake pressure adjusting unit if the contact state is not reached during the locking operation, and ends the pressure-decreasing limit control if the moving-member contact state is reached, and
   wherein the pressure-decreasing rate of the hydraulic brake pressure is adjusted so that a sum of an impact force of the moving member on the pressing member at the time of bringing the moving member into contact with the pressing member, which is generated due to the movement of the moving member by the electronic parking brake at the time of performing the locking operation, and an impact force of the pressing member on the moving member at the time of bringing the pressing member into contact with the moving member, which is generated in the pressing member due to the decrease in the hydraulic brake pressure in the wheel cylinder and which is predicted based on the pressure-decreasing rate of the hydraulic brake pressure, is not greater than a predetermined threshold value.

2. The vehicle brake control device according to claim 1, wherein the determining unit determines the contact state based on the driving load of the electric motor.

3. The vehicle brake control device according to claim 2, wherein the pressure-decreasing limit control is performed so as to limit a pressure-decreasing rate of the hydraulic brake pressure of the wheel cylinder to a predetermined rate or less.

4. The vehicle brake control device according to claim 1, wherein the pressure-decreasing limit control is performed so as to limit a pressure-decreasing rate of the hydraulic brake pressure of the wheel cylinder to a predetermined rate or less.

* * * * *